United States Patent
Misra

(10) Patent No.: US 8,346,516 B2
(45) Date of Patent: Jan. 1, 2013

(54) PREDICTIVE MODELING

(75) Inventor: Vishwas Misra, New Delhi (IN)

(73) Assignee: Accenture Global Services Limited, Dublin (IE)

( * ) Notice: Subject to any disclaimer, the term of this patent is extended or adjusted under 35 U.S.C. 154(b) by 1044 days.

(21) Appl. No.: 12/265,281

(22) Filed: Nov. 5, 2008

(65) Prior Publication Data

US 2010/0114554 A1  May 6, 2010

(51) Int. Cl.
  *G06F 7/60* (2006.01)
  *G06F 17/10* (2006.01)
(52) U.S. Cl. .......................................................... 703/2
(58) Field of Classification Search ....................... 703/2
  See application file for complete search history.

(56) References Cited

U.S. PATENT DOCUMENTS

| | | | |
|---|---|---|---|
| 5,630,070 A | 5/1997 | Dietrich et al. |
| 5,946,662 A | 8/1999 | Ettl et al. |
| 6,061,691 A | 5/2000 | Fox |
| 6,341,269 B1 | 1/2002 | Dulaney et al. |
| 6,366,890 B1 | 4/2002 | Usrey |
| 6,970,841 B1 | 11/2005 | Cheng et al. |
| 2001/0047293 A1 | 11/2001 | Waller et al. |
| 2005/0004831 A1 | 1/2005 | Najmi et al. |
| 2005/0288993 A1 | 12/2005 | Weng et al. |

OTHER PUBLICATIONS

Better et al. "Advances in Analytics: Integrating Dynamic Data Mining with Simulation Optimization." IEEE May 2007.*

* cited by examiner

*Primary Examiner* — Saif Alhija
(74) *Attorney, Agent, or Firm* — Fish & Richardson P.C.

(57) ABSTRACT

Predictive modeling, in which a first simulation model that simulates a first policy for managing a set of data is determined based on a pattern representative of the set of data and first operating variables for the first policy. The first simulation model is optimized and first prediction data that estimates performance of the first policy is computed using the optimized first simulation model. A second simulation model that simulates a second policy for managing the set of data is determined based on the pattern and second operating variables for the second policy. The second simulation model is optimized and second prediction data that estimates performance of the second policy is computed using the optimized second simulation model. The first prediction data is compared with the second prediction data, and a determination of whether the first policy is better than the second policy is made.

16 Claims, 10 Drawing Sheets

PREDICTIVE MODELING

TECHNICAL FIELD

This description generally relates to modeling policies for managing sets of data.

BACKGROUND

Within processes, performance may be impacted based on policies and strategies used in managing the processes. Although a process may be optimized after a policy or strategy has been selected, detailed data may not be available to enable informed selection of a policy or strategy to use in managing the process prior to initial selection.

SUMMARY

According to one general implementation, a predictive modeling system includes at least one electronic data store and at least one processor. The at least one electronic data store is configured to store a set of data, simulation models that estimate performance of policies for managing sets of data, and results of a determination related to estimated performance of the policies computed using the simulation models. The at least one processor is configured to access, from the at least one electronic data store, the set of data and identify a pattern representative of the set of data. The at least one processor also is configured to access first operating variables that correspond to a first policy for managing the set of data and determine a first simulation model that estimates performance of the first policy for managing the set of data based on the identified pattern representative of the set of data and the accessed first operating variables. The at least one processor further is configured to optimize the first simulation model to estimate optimum operating variables for executing the first policy for managing the set of data and compute, using the optimized first simulation model, first prediction data that estimates performance of the first policy for managing the set of data.

In addition, the at least one processor is configured to access second operating variables that correspond to a second policy for managing the set of data and determine a second simulation model that estimates performance of the second policy for managing the set of data based on the identified pattern representative of the set of data and the accessed second operating variables. The at least one processor also is configured to optimize the second simulation model to estimate optimum operating variables for executing the second policy for managing the set of data and compute, using the optimized second simulation model, second prediction data that estimates performance of the second policy for managing the set of data.

Further, the at least one processor is configured to compare the first prediction data with the second prediction data and, based on the comparison of the first prediction data with the second prediction data, determine whether the estimated performance of the first policy for managing the set of data is better than the estimated performance of the second policy for managing the set of data. The at least one processor also is configured to store, in the at least one electronic data store, results of the determination of whether the estimated performance of the first policy for managing the set of data is better than the estimated performance of the second policy for managing the set of data.

According to another general implementation, a set of data is accessed from electronic storage and a pattern representative of the set of data is identified. First operating variables that correspond to a first policy for managing the set of data are accessed and a first simulation model that estimates performance of the first policy for managing the set of data is determined based on the identified pattern representative of the set of data and the accessed first operating variables. The first simulation model is optimized to estimate optimum operating variables for executing the first policy for managing the set of data and first prediction data that estimates performance of the first policy for managing the set of data is computed using the optimized first simulation model.

In addition, second operating variables that correspond to a second policy for managing the set of data are accessed and a second simulation model that estimates performance of the second policy for managing the set of data is determined based on the identified pattern representative of the set of data and the accessed second operating variables. The second simulation model is optimized to estimate optimum operating variables for executing the second policy for managing the set of data and second prediction data that estimates performance of the second policy for managing the set of data is computed using the optimized second simulation model.

Further, the first prediction data is compared with the second prediction data. Based on the comparison of the first prediction data with the second prediction data, it is determined whether the estimated performance of the first policy for managing the set of data is better than the estimated performance of the second policy for managing the set of data. Results of the determination of whether the estimated performance of the first policy for managing the set of data is better than the estimated performance of the second policy for managing the set of data are stored in electronic storage.

Implementations may include one or more of the following features. For example, a stochastic process may be performed to identify a stochastic probability distribution that replicates the set of data. For each of a range of possible operating variable combinations, an operating variable combination may be identified from among the possible operating variable combinations, and prediction data that estimates performance of the first policy for managing the set of data based on the identified operating variable combination may be computed using the first simulation model. The prediction data computed for each of the range of possible operating variable combinations may be analyzed. Based on the analysis, an optimum operating variable combination that maximizes the estimated performance of the first policy for managing the set of data may be selected from among the possible operating variable combinations.

In some implementations, historical sales data for a product may be accessed from electronic storage and a demand pattern for the product may be identified using stochastic processing. First operating variables for managing inventory for the product using a forecasting strategy may be accessed and a first simulation model that estimates performance of the forecasting strategy may be determined. The first simulation model may be optimized to estimate optimum operating variables for executing the forecasting strategy and first cost data that estimates the cost of executing the forecasting strategy may be computed using the optimized first simulation model.

In these implementations, second operating variables for managing inventory for the product using a re-order strategy may be accessed and a second simulation model that estimates performance of the re-order strategy may be determined. The second simulation model may be optimized to estimate optimum operating variables for executing the re-order strategy and second cost data that estimates the cost of executing the re-order strategy may be computed using the optimized second simulation model.

Further, in these implementations, the first cost data that estimates the cost of executing the forecasting strategy may be compared with the second cost data that estimates the cost of executing the re-order strategy. Based on the comparison of the first cost data with the second cost data, it may be determined whether the estimated cost of executing the forecasting strategy is less than the estimated cost of executing the re-order strategy.

In some examples, an output may be generated based on the determination of whether the estimated cost of executing the forecasting strategy is less than the estimated cost of executing the re-order strategy. In these examples, a difference between the estimated cost of executing the forecasting strategy and the estimated cost of executing the re-order strategy may be computed and a graph showing the difference between the estimated cost of executing the forecasting strategy and the estimated cost of executing the re-order strategy may be generated. The graph showing the difference between the estimated cost of executing the forecasting strategy and the estimated cost of executing the re-order strategy may be displayed with an indication of whether the estimated cost of executing the forecasting strategy is less than the estimated cost of executing the re-order strategy. At least one of initial inventory of the product, lead time for the product, inventory holding cost for the product, inventory handling cost for the product, mean forecast error, weighted average cost of capital, contribution margin of the product, and cost of lost sale of the product may be accessed.

In further implementations, multiple constraints for managing the set of data may be identified and an optimum policy for managing the set of data may be determined, from among at least the first and second policies for managing the set of data, for each of the multiple constraints. In these implementations, performance data may be computed that estimates performance of each of the multiple constraints using the optimum policy determined for the each of the multiple constraints, the computed performance data for each of the multiple constraints may be compared, and an output may be generated based on the comparison.

Further, multiple service levels for providing a product may be identified and an optimum strategy for managing inventory for the product may be determined, from among at least a forecasting strategy and a re-order strategy for managing inventory for the product, for each of the multiple service levels. Cost data that estimates a cost of achieving each of the multiple service levels may be computed using the optimum policy determined for the each of the multiple service levels, the computed cost data that estimates the cost of achieving each of the multiple service levels may be compared, and an indication of the cost and contribution of achieving each of the multiple service levels may be displayed on a display device.

In yet another general implementation, multiple sets of data of interest are identified and the multiple sets of data are clustered into one or more families having similar attributes. One or more sample sets of data from a clustered family of data are selected and a pattern representative of each of the selected sample sets of data is identified. Operating variables for at least two policies for managing each of the selected sample sets of data are accessed and simulation models that estimate performance of the at least two policies for managing each of the selected sample sets of data are determined. Each of the simulation models are optimized to estimate optimum operating variables for executing each of the at least two policies and simulations for each of the selected sample sets of data are performed using each of the optimized simulation models. For each of the at least two policies, regression analysis is performed using the optimized simulation results for each of the selected sample sets of data and performance data that estimates performance of each of the at least two policies for managing the clustered family of data is computed using regression equations based on the regression analysis. Based on the computed performance data, it is determined which of the at least two policies is better for managing the clustered family of data based on the computed performance data and results of the determination of which of the at least two policies is better for managing the clustered family of data are stored in electronic storage.

Implementations may include one or more of the following features. For example, for each of the selected sample sets of data, a stochastic process may be performed to identify a stochastic probability distribution that replicates the each of the selected sample sets of data. The multiple sets of data may be clustered into one or more families having similar operating variables with similar values. A subset of the sets of data included in the clustered family of data may be selected and it may be determined which of the at least two policies is better for managing the clustered family of data without analyzing sets of data included in the clustered family of data other than the selected subset.

In some implementations, multiple low value products of interest may be identified and the multiple low value products may be clustered into one or more product families that include products having similar operating variables. Sample data from one or more products in a clustered product family may be selected and a demand pattern for each of the selected products may be determined using stochastic processing. For each of the selected products, first operating variables for managing inventory for the product using a forecasting strategy and second operating variables for managing inventory for the product using a re-order strategy may be accessed and simulation models that estimate performance of the forecasting strategy and the re-order strategy may be determined for each of the selected products. Each of the simulation models may be optimized to estimate optimum operating variables for executing each of the forecasting strategy and the re-order strategy and simulations for each of the selected products may be performed using each of the optimized simulation models. For each of the forecasting strategy and the re-order strategy, regression analysis may be performed using the optimized simulation results for each of the selected products and performance data that estimates performance of each of the forecasting strategy and the re-order strategy for managing inventory of the clustered product family may be computed using regression equations based on the regression analysis. Based on the computed performance data, it may be determined which of the forecasting strategy and the re-order strategy is better for managing inventory of the clustered product family and results of the determination of which of the forecasting strategy and the re-order strategy is better for managing inventory of the clustered product family may be stored in electronic storage.

In these implementations, it may be determined which of the forecasting strategy and the re-order strategy is better for managing inventory of the clustered product family without analyzing all of the low value products in the clustered product family. In addition, it may be determined which of the forecasting strategy and the re-order strategy is better for managing inventory of the clustered product family without analyzing all of data in the clustered product family.

In a further general implementation, a predictive modeling system includes at least one electronic data store and at least one processor. The at least one electronic data store is configured to store multiple sets of data, simulation models that estimate performance of policies for managing sets of data, and results of a determination related to estimated performance of the policies computed using the simulation models. The at least one processor is configured to identify multiple sets of data of interest and cluster the multiple sets of data into one or more families having similar attributes. The at least one processor also is configured to select one or more sample sets of data from a clustered family of data and identify a pattern representative of each of the selected sample sets of data. The at least one processor further is configured to access operating variables for at least two policies for managing each of the selected sample sets of data and determine simulation models that estimate performance of the at least two policies for managing each of the selected sample sets of data.

In addition, the at least one processor is configured to optimize each of the simulation models to estimate optimum operating variables for executing each of the at least two policies and perform, using each of the optimized simulation models, simulations for each of the selected sample sets of data. The at least one processor also is configured to perform, for each of the at least two policies, regression analysis using the optimized simulation results for each of the selected sample sets of data and compute, using regression equations based on the regression analysis, performance data that estimates performance of each of the at least two policies for managing the clustered family of data. The at least one processor further is configured to determine which of the at least two policies is better for managing the clustered family of data based on the computed performance data and store, in the at least one electronic data store, results of the determination of which of the at least two policies is better for managing the clustered family of data.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

DETAILED DESCRIPTION

According to one general implementation, multiple policies (e.g., strategies) for managing sets of data are modeled and simulations for executing each of the multiple policies are run. Results of the simulations are compared, and a predicted optimum policy is identified from among the multiple policies modeled. The predicted optimum policy may be identified as the policy in which the simulation results indicate the best performance (e.g., the policy in which simulation results indicate the least cost or the most contribution). Data identifying the predicted optimum policy may be stored and displayed to a user. The user may choose whether or not to implement the predicted optimum policy or an Enterprise Information Technology system may update configurations based on the predicted optimum policy automatically without user intervention.

Policies (e.g., strategies) for managing sets of data broadly relate to policies that impact data. For instance, policies (e.g., strategies) for managing sets of data may be policies (e.g., strategies) for managing or implementing processes that result in data (e.g., processes that result in the generation of data). The policies (e.g., strategies) may impact future data generated by a process and aspects of past data related to the process may be used in modeling and simulating the policies (e.g., strategies). A set of data may be data that is related in some way (e.g., data that results from a particular process or data that relates to similar or the same items), may be any amount of data (e.g., a single entry or many entries), and may be in any format.

In one example, a policy for managing a set of data may be an inventory management policy that a company uses to manage inventory of a particular product. In this example, past sales data for the particular product may be used to model customer demand for the particular product and the customer demand may be used in simulating multiple, different inventory management policies for managing inventory for the particular product. The multiple, different inventory management policies result in future sales and/or inventory data related to the particular product. The multiple, different inventory management policies may be modeled, simulated, and compared to identify an optimum inventory management policy for the particular product.

Figure 1:
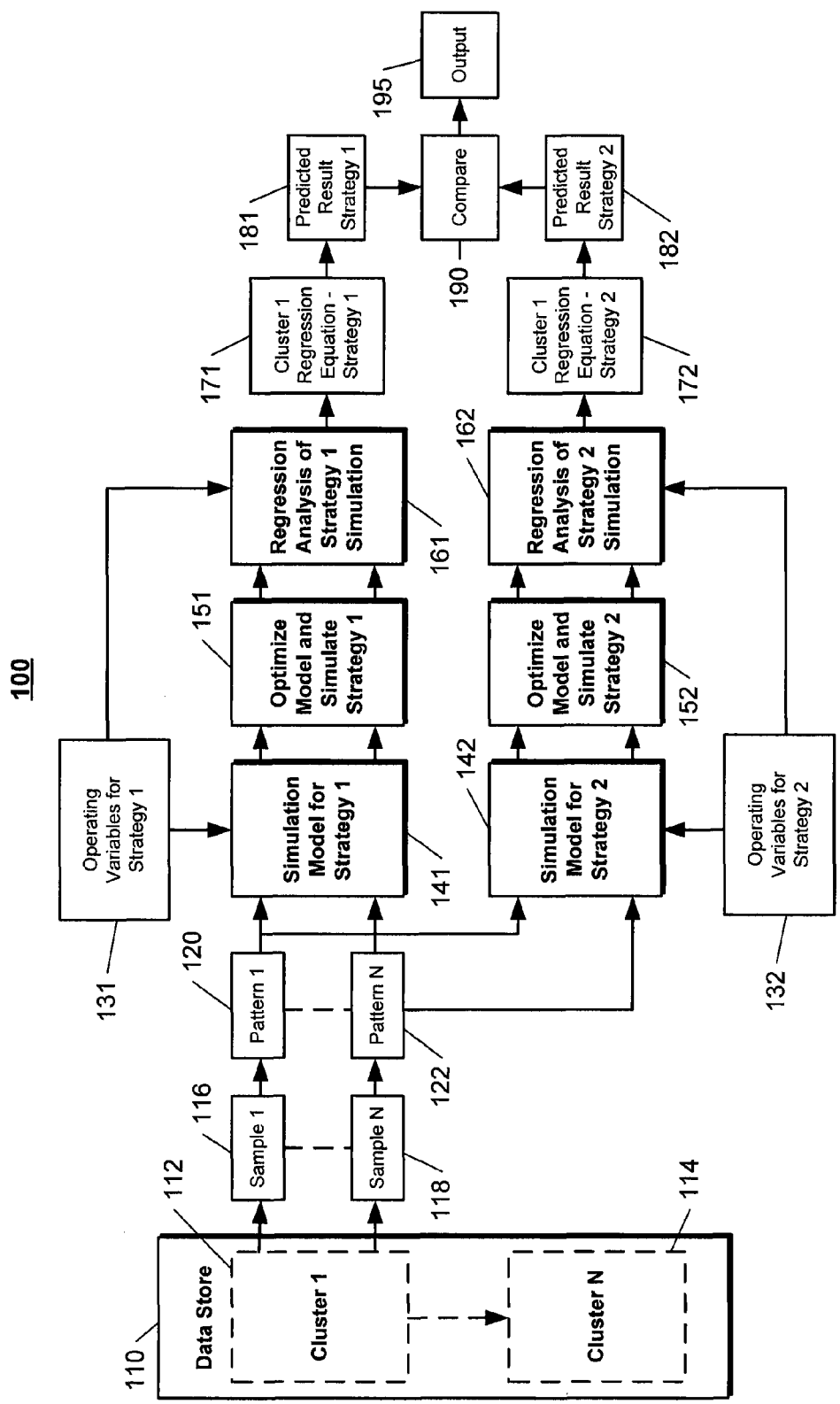
FIG. 1 is a contextual diagram of an exemplary process.

FIG. 1 illustrates an exemplary process 100 for modeling and comparing multiple policies for managing a set of data. The process 100 is described generally as being performed by a processor. In some implementations, the processor may be included in an electronic device or system. The process 100 may be performed by multiple processors included in one or more electronic devices or systems.

The processor uses a data store 110 that electronically stores data (e.g., sets of data). As shown, the data stored in the data store 110 is clustered in multiple clusters or families 112, 114 of data having similar attributes. For instance, multiple, different sets of data may be clustered together based on attributes of the data (or attributes of a process that results in the data) having similarities. The clustered families 112, 114 of data may exhibit similar patterns or may result from processes that have similar operating variables. The processor may cluster the sets of data in an automated process that compares attributes related to the sets of data and clusters the sets of data having similar attributes together based on the comparison.

Clustering sets of data may reduce the costs of analyzing and comparing different policies for managing the sets of data. Specifically, rather than analyzing and comparing different policies for managing each of the sets of data individually, clustering enables a system to analyze and compare different policies for managing samples (e.g., subsets) of the clustered family. The processor applies the result of the analysis and comparison of the different policies for managing the samples to the entire clustered family of data. Because the sets of data included in the clustered family have similar attributes, the result of the analysis and comparison of the different policies for each of the sets of data is likely to be the same or similar. Thus, performing the analysis and comparison of the different policies to only a sample (e.g., a subset) of the clustered family of data and applying the results to the entire family may reduce costs and/or computing resources needed to perform the analysis of the clustered family of data (which may be substantial) because each set of data does not need to be individually analyzed. In addition, clustering may improve the accuracy of prediction for the optimum strategy.

For instance, low value products (e.g., products with a low profit margin) may be clustered together for purposes of analyzing multiple, different inventory management policies for the low value products. Because the cost of performing an analysis of multiple, different inventory management policies for each of the low value products (e.g., packs of gum, candy bars, single serving bottles of soda, small packages of batteries, etc.) is likely not justified due to the low profit margin of the products and/or the high number of low value products that exist, clustering the low value products together and analyzing samples from the cluster saves costs associated with the analysis and provides a reasonable inventory management analysis for the entire cluster at a low cost. Accordingly, clustering low value products together may allow the low value products to gain the benefits (or a majority of the benefits) of analyzing multiple, different inventory management policies for the low value products when it may not otherwise make sense to perform the analysis on any one of the low value products.

After the data in the data store 110 has been clustered, the processor retrieves samples 116, 118 of data from at least one clustered family 112. The samples 116, 118 may be a general sample of data included in the at least one clustered family 112 (e.g., a sampling of data from all sets of data included in the clustered family) or may be one or more particular sets (e.g., full sets of data, but less than all sets) of data included in the clustered family. The samples 116, 118 may be selected randomly or using techniques that identify samples of data that are representative of the entire family. Although FIG. 1 shows multiple samples of data being selected, a single sample of data may be selected and the single sample of data analyzed to represent the entire clustered family of data.

For each of the samples 116, 118, the processor identifies a pattern 120, 122 representative of the corresponding sample 116, 118. The processor may identify a pattern 120, 122 by analyzing the samples 116, 118 of data as stochastic processes and determining a stochastic model or probability distribution that simulates the samples 116, 118 of data. The pattern 120, 122 may be a model or an equation that is representative of the samples 116, 118 of data and may be used to estimate parameters such as operating policies.

In implementations in which the system 100 models and compares multiple inventory management policies for a clustered family of product data, each of the samples 116; 118 may correspond to past sales data for a particular product and each of the patterns 120, 122 may be models that simulate the demand pattern for the particular product. The demand pattern may be determined using stochastic processing and may be a probability distribution that the demand for the particular process follows. The demand pattern may be modeled using a random number equation that most closely replicates demand in terms of cost data.

The processor also accesses operating variables 131, 132 for each of the multiple, different polices (e.g., strategies) for managing a set of data that the processor models and compares. The operating variables 131, 132 are variables or constraints on the multiple, different policies for managing a set of data. The operating variables 131 themselves and/or values of particular operating variables may be the same as the operating variables 132 or may be different than the operating variables 132. The operating variables 131, 132 may be received by the processor as user input (e.g., inputted by a user into a spreadsheet) or may be accessed from electronic storage.

In implementations in which the processor models and compares multiple inventory management policies for a clustered family of product data, the operating variables 131, 132 may relate to constraints on the sale of particular products and replenishment of inventory for the particular products. For example, the operating variables 131, 132 may be supply lead times, order cost, handling costs, retail price, minimum/maximum inventory, inventory to be maintained, ordered quantity, etc. The operating variables 131, 132 may differ between retailers and, therefore, may be tailored to a specific retail environment for a specific product. The operating variables 131, 132 may be constant values or may be a range of possible values. When the operating variables 131, 132 are a range of possible values, costs corresponding to each of the values within the range may be assigned and considered when optimizing a simulation model.

The processor uses the patterns 120, 122 and the operating variables 131, 132 to determine a simulation model 141, 142 for each of the multiple, different polices (e.g., strategies) for managing a set of data that the processor models and compares. A simulation model for each strategy may be determined for each sample of data (e.g., each product selected from a clustered family of product data). To determine the simulation models 141, 142, a base simulation model may be predetermined for each of the policies for managing a set of data. The base simulation model then may be adjusted and tailored based on the patterns 120, 122 and the operating variables 131, 132.

For example, the simulation models 141, 142 may model two different types of inventory management policies. Namely, the simulation model 141 may model a forecasting inventory management policy and the simulation model 142 may model a re-order inventory management policy. A forecasting inventory management policy forecasts demand for a particular product and orders additional inventory of the particular product based on the prospective demand and current inventory. A re-order inventory management policy orders additional inventory of a particular product when the inventory of the particular product falls below a minimum threshold (e.g., when all inventory of a product has been depleted or only a few units of the product remain).

When the simulation model 141 models a forecasting inventory management policy, a base model for a forecasting inventory management policy may be tailored to a specific product in a specific retail environment. The base model for a forecasting inventory management policy may model processes that occur when implementing a forecasting inventory management policy and may accept as input a demand pattern of a product and operating variables that control operation of the retail environment (e.g., retail price, lead time, etc.). The base model may be adjusted in accordance with the demand pattern and operating variables to determine a simulation model tailored to a particular product in a particular retail environment. The updated simulation model may include variables for implementing the forecasting strategy (e.g., the amount of inventory to order and how often to order new inventory) and output a cost/contribution (e.g., profit) associated with particular values selected for the variables for implementing the forecasting strategy.

When the simulation model 142 models a re-order inventory management policy, a base model for a re-order inventory management policy may be tailored to a specific product in a specific retail environment. The base model for a re-order inventory management policy may model processes that occur when implementing a re-order inventory management policy and may accept as input a demand pattern of a product and operating variables that control operation of the retail environment (e.g., retail price, lead time, etc.). The base model may be adjusted in accordance with the demand pattern and operating variables to determine a simulation model tailored to a particular product in a particular retail environment. The updated simulation model may include variables for implementing the re-order strategy (e.g., the amount of inventory to order and the minimum threshold of inventory that triggers an order) and output a cost/contribution (e.g., profit) associated with particular values selected for the variables for implementing the re-order strategy.

After determining the simulation models 141, 142, the processor optimizes each of the simulation models and simulates each of the multiple, different policies for managing a set data using the optimized models 151, 152. To optimize the simulation models, the processor performs multiple simulations using different combinations of operating variables (e.g., different combinations of operating variable values) and identifies the combination of operating variables that yields the best performance based on the simulation results. During optimization, the processor may vary values of the operating variables 131, 132 to the extent that the operating variables 131, 132 define a range of acceptable values. In addition, the processor may vary values of operating variables for implementing the corresponding policy for managing a set of data to identify optimum operating values for implementing the policy. For example, when the policy for managing a set of data is a forecasting inventory management policy, the processor varies values of the amount of inventory to order and how often to order new inventory to identify optimum values for the amount of inventory to order and how often to order new inventory.

Using the optimized operating variables, the processor simulates each of the multiple, different policies for managing a set data. The results of the simulation may include performance data, such as an anticipated cost/contribution metric (e.g., profit) of implementing the optimized policy. The results may be a probability distribution that includes a variety of simulated results and the probability associated with each of the results.

Based on the optimized simulation results 151, 152 and the optimum operating variables 131, 132, the processor performs a regression analysis for each of the multiple, different polices (e.g., strategies) for managing a set of data. The regression analysis results in one or more equations that may be used as a best fit for modeling performance of the entire clustered family of data. In performing the regression analysis, the operating parameters may be the independent variables and cost/profit may be the dependent variables.

In implementations in which the samples 116, 118 correspond to a subset of products selected from among a set of products (e.g., low value products) clustered into a product family, the optimized simulation results include a cost/profit value and optimized operating variables for each of the selected products. The processor performs a regression analysis using the cost/profit as the dependent variable and the optimized operating variables as the independent variables. The dependent variable in the regression equation (e.g., cost/profit) is modeled as a function of the independent variables (e.g., operating variables), corresponding parameters, and an error term. The error term may be treated as a random variable, and represent unexplained variation in the dependent variable. The processor estimates the parameters to give a best fit of the cost/profit value and optimized operating variables data resulting from the simulations performed for each of the selected products.

After generating one or more regression equations that model each of the multiple, different policies for managing a set of data 171, 172 for the clustered family 112, the processor generates a predicted result 181, 182 for each of the multiple, different policies using the regression equations. The predicted results 181, 182 apply generally to the clustered family of data 112, rather than to any specific set of data included in the clustered family of data 112. Similar to the optimized simulation results, the predicted results 181, 182 may include performance data for the corresponding policy, such as an anticipated cost/contribution metric (e.g., profit) of implementing the policy. The results may be a probability distribution that includes a variety of predicted results and the probability associated with each of the results.

The processor compares 190 the predicted results 181, 182 for each of the policies and generates an output 195. The output 195 may indicate which of the policies performed better for the clustered family of data 112 and may provide a display of each of the predicted results 181, 182. For instance, the processor may store results of the comparison 190 in electronic storage and display, on a display device, an output to the user indicating which of the possible policies for managing the family of data performed better in the simulation.

The output 195 may indicate how much each of the strategies performed better in the simulation and may indicate a probability (e.g., a degree of risk) that the policies will perform at the optimum level. For example, the output 195 may indicate that, for a first policy, the optimum result outperforms a second policy, but that the first policy is riskier than the second policy to implement and achieve consistent results. In this example, the average predicted performance of the first policy may be less than the average predicted performance of the second policy, despite the optimum performance of the first policy being higher than the optimum performance of the second policy. The output 195 may reflect the relative degrees of risk in implementing each of the possible policies and, thereby, provide the user with an opportunity to factor the degree of risk in a policy selection decision.

A user may consider the output 195 in choosing whether or not to implement the predicted optimum policy. In some implementations, the processor may update configurations based on the predicted optimum policy automatically without user intervention. In these implementations, when the policy for managing the set of data is an inventory management policy, the processor may automatically configure an inventory management system to place orders and/or generate reminders or reports using the predicted optimum inventory management policy. The processor also may, in the inventory management system, automatically set variables to the optimum operating variables and change settings to implement the optimum policy (e.g., change settings from a forecasting policy to a re-order policy when the re-order policy is determined to be optimum).

In further implementations, the processor may track future data generated using the predicted optimum policy. The processor may use the tracked data to determine whether the prediction determined in the process 100 was correct (e.g., the profit data is in line with the predicted profit). If the processor determines that the performance of the predicted optimum policy was incorrect, the processor may repeat process 100 based on the new data and update the identification of the optimum policy. The processor also may adjust (e.g., fine tune) the simulation model for the policy being implemented to better predict the results of how performance of the policy actually performed.

Although two policies for managing a set of data were modeled and compared in the process 100, more (and perhaps many more) policies for managing a set of data may be modeled and compared. In addition, an optimum policy and predicted result may be determined for each of multiple, different service levels to enable comparison of the costs of the multiple, different service levels. Moreover, although the process 100 clustered data from the data store 110 into families, particular sets of data may be modeled and compared directly without clustering.

Figure 2:
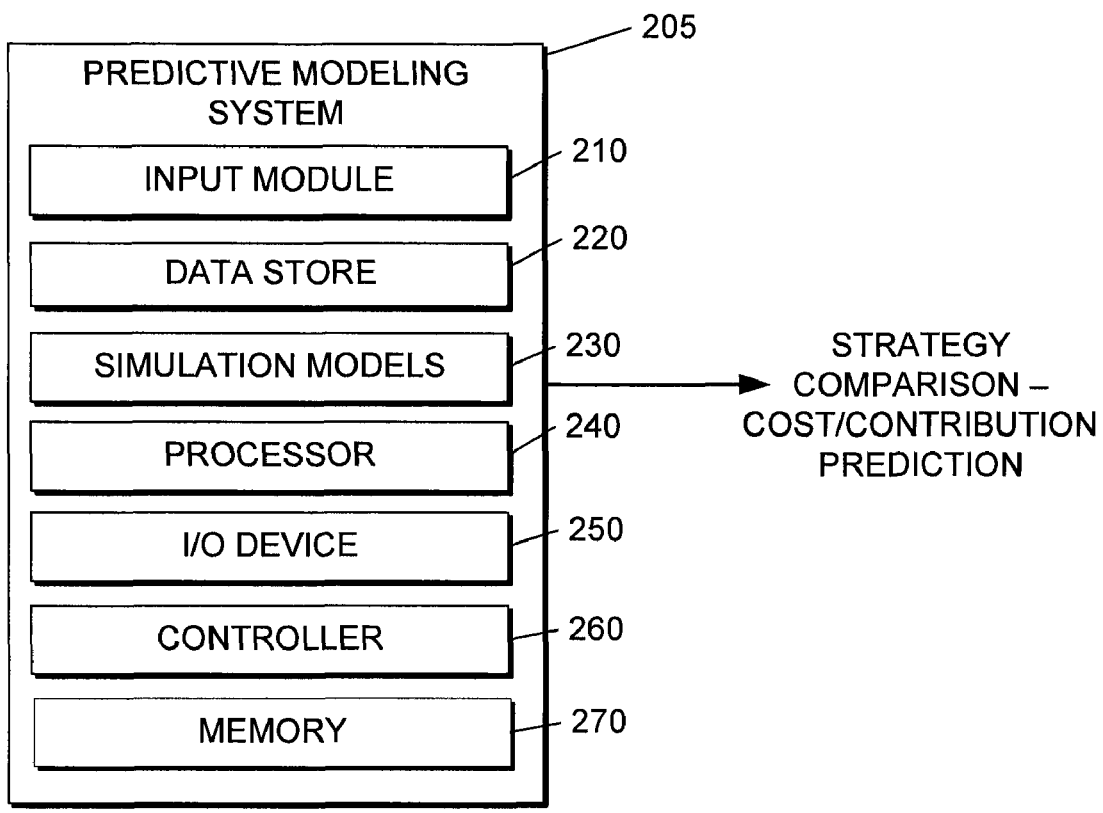
FIG. 2 is a block diagram of an exemplary system.

Referring to FIG. 2, a block diagram 200 of a predictive modeling system 205 is shown. The system 205 includes an input module 210, a data store 220, simulation models 230, a processor 240, an I/O device 250, a controller 260, and a memory 270. The predictive modeling system 205 may be used to determine a strategic comparison of multiple policies (e.g., strategies) for managing a set of data (e.g., a cost/contribution prediction for multiple policies). The predictive modeling system 205 may be implemented within hardware or software.

The input module 210 imports data associated with a process. The data may include data resulting from a particular process (e.g., product data related to past sales of products and/or current inventory of products). The data also may include operating variables used in one or more policies for managing a set of data (e.g., operating variables used in one or more inventory management strategies). For example, the input module 210 may receive data, in a spreadsheet, of operating variables related to an inventory management strategy for a particular product.

The data also may include data acquired from outside of the process. In some implementations, the input module 210 receives data from a source external to the system 205. The input module 210 also may receive data from a source within the system 205, and further may access data, either from within the system 205 or from a source external to the system 205. In some implementations, the input module 210 reformats and/or transforms the data such that the data may be processed and stored by other components within the system 205.

The predictive modeling system 205 also includes a data store 220. In some implementations, data from the input module 210 is stored in the data store 220. The data store 220 may be, for example, a relational database that logically organizes data into a series of database tables. The data included in the data store 220 may be, for example, data resulting from a particular process (e.g., product data related to past sales, demand, and/or inventory of products). Each database table arranges data in a series of columns (where each column represents an attribute of the data stored in the database) and rows (where each row represents attribute values). The data store 220 may be, for example, an object-oriented database that logically or physically organizes data into a series of objects. Each object may be associated with a series of attribute values. The data store 220 also may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The predictive modeling system 205 also includes simulation models 230. The simulation models 230 may represent models that simulate multiple, different policies (e.g., strategies) for managing a set of data. For example, the simulation models 230 may include a first simulation model for managing a forecasting inventory management strategy and a second simulation model for managing a re-order inventory management strategy. In some implementations, the simulation models 230 receive data based on product data from the data store 220 (e.g., past sales data) and simulate cost and contribution of the corresponding inventory management strategy. In other implementations, the simulation models 230 may access such data from the data store 220, or a source external to the predictive modeling system 205. Based on simulation results (e.g., cost and contribution data), the multiple, different inventory management strategies may be compared and an optimum inventory management strategy may be identified.

The simulation models 230 may be specialized hardware or software modules that are pre-programmed or pre-configured to invoke specialized or proprietary functionality. In another aspect, the simulation models 230 may be more generic hardware or software modules that are capable of implementing generic and specialized functionality.

The predictive modeling system 205 also includes the processor 240. The processor 240 may be a processor suitable for the execution of a computer program such as a general or special purpose microprocessor, and any one or more processors of any kind of digital computer. Generally, a processor receives instructions and data from a read-only memory or a random access memory or both. The processor 240 receives instructions and data from the components of the predictive modeling system 205 to, for example, output and store a strategic comparison of multiple policies (e.g., strategies) for managing a set of data. In some implementations, the predictive modeling system 205 includes more than one processor.

The predictive modeling system 205 also includes the I/O device 250, which is configured to allow a user selection. For example, the I/O device 250 may be a mouse, a keyboard, a stylus, or any other device that allows a user to input data into the predictive modeling system 205 or otherwise communicate with the predictive modeling system 205. In some implementations, the user may be a machine and the user input may be received from an automated process running on the machine. In other implementations, the user may be a person. The I/O device 250 also may include a device configured to output the strategic comparison data.

The predictive modeling system 205 also includes the controller 260. The controller 260 is an interface to a process. The controller 260 may receive feedback from the process, such as costs and sales data of implemented inventory management strategies. The controller 260 also may cause changes in the system in response to the feedback, such as, for example, updating a simulation model or suggesting an alternative policy based on the feedback.

The predictive modeling system 205 also includes a memory 270. The memory 270 may be any type of machine-readable storage medium. The memory 270 may, for example, store the data included in the data store 220. In some implementations, the memory 270 may store instructions that, when executed, cause the simulation models 230 to determine a prediction of performance of policies for managing a set of data (e.g., managing a process that results in the set of data).

Although the example predictive modeling system 205 is shown as a single integrated component, one or more of the modules and applications included in the predictive modeling system 205 may be implemented separately from the system 205 but in communication with the system 205. For example, the data store 220 may be implemented on a centralized server that communicates and exchanges data with the predictive modeling system 205.

Figure 3:
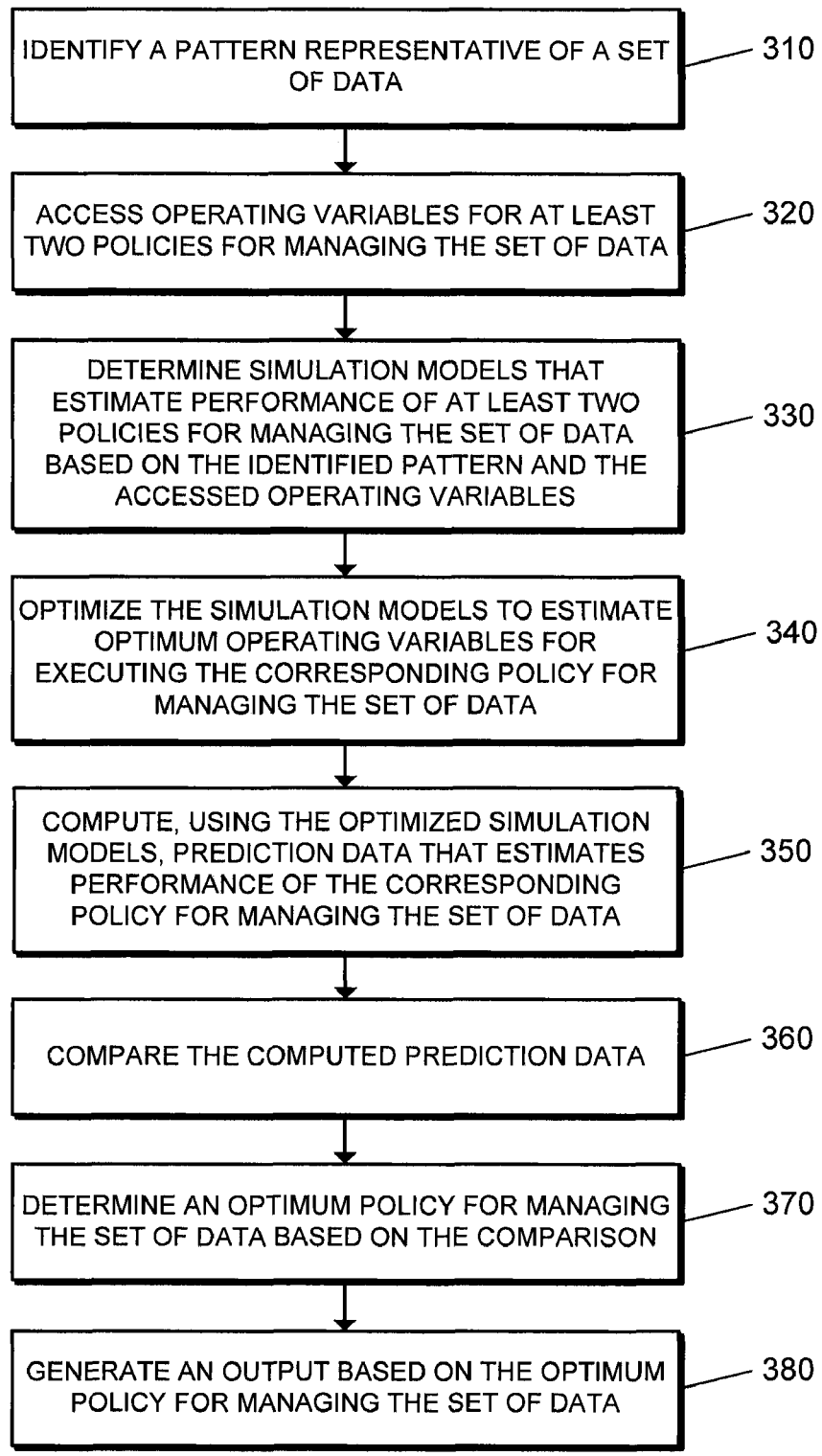
FIGS. 3 to 6, 8, and 9 are flowcharts of exemplary processes.

Referring to FIG. 3, an example process 300 is illustrated. The example process 300 generates an output based on a policy determined to be an optimum policy for managing a set of data. The process 300 may be performed by the processor 240 included in the predictive modeling system 205 discussed above with respect to FIG. 2.

The processor 240 identifies a pattern representative of a set of data (310). For example, the processor 240 may identify the pattern representative of the set of data by performing a stochastic process to identify a stochastic probability distribution that replicates the set of data. The pattern may be a model or an equation that is representative of the set of data and may be used to estimate future data corresponding to the set of data.

The processor 240 also accesses operating variables for at least two policies for managing the set of data (320). The operating variables may be variables or constraints on the at least two policies for managing the set of data and impact the performance of the at least two policies for managing the set of data. For instance, the operating variables may include operations metrics (such as time and expense of performing certain operations in implementing the policy) and financial/business metrics (such as costs and profits resulting from a variety of outcomes in implementing the policy).

The operating variables themselves and/or values of particular operating variables may be the same or may be different for different policies. The processor 240 may access operating variables by receiving user input (e.g., inputted by a user into a spreadsheet) that specifies the operating variables, receiving the operating variables from another device (e.g., a customer's computer system) over a network, or retrieving the operating variables from electronic storage.

Based on the identified pattern and the accessed operating variables, the processor 240 determines simulation models that estimate performance of at least two policies for managing the set of data (330). The processor 240 may access, from electronic storage, a predetermined simulation model (e.g., a template model) that is able to estimate the costs and contribution values for a policy. The processor 240 then uses the identified pattern and the accessed operating variables to modify the predetermined simulation model to operations specific to the client. Modifications may include changing input variables (e.g., assumptions) and certain relationships within the predetermined model. Modifying the predetermined simulation model enables tailoring of the simulation model to the specific policy that the processor 240 is attempting to optimize and compare. The processor 240 also may create a simulation model based on the identified pattern and the accessed operating variables without first accessing a predetermined simulation model. Separate simulation models may be determined for each of the policies such that each simulation model corresponds to a single policy. In some implementations, at least a portion of some of the simulation models may be shared when modeling the different policies.

The processor 240 optimizes the simulation models to estimate optimum operating variables for executing the corresponding policy for managing the set of data (340). For example, the processor 240 performs repeated simulations attempting to find the optimum combination of operating variables (e.g., values of operating variables) that minimize or maximize a target variable or output. In this example, the processor 240 may attempt to minimize cost, perform a simulation that estimates cost for each possible operating variable combination, and identify the operating variable combination that results in the lowest estimated cost. In optimizing a simulation model, an operating variable may be varied within a defined range (e.g., defined by the customer, defined by constraints of effectively operating the policy or meeting a particular service level, etc.) and may have corresponding cost/benefit values associated with changing the operating variable (e.g., providing a lead time of two days costs ten dollars, whereas providing a lead time of one day costs twenty dollars). An example optimization routine is shown in FIG. 4.

Figure 4:
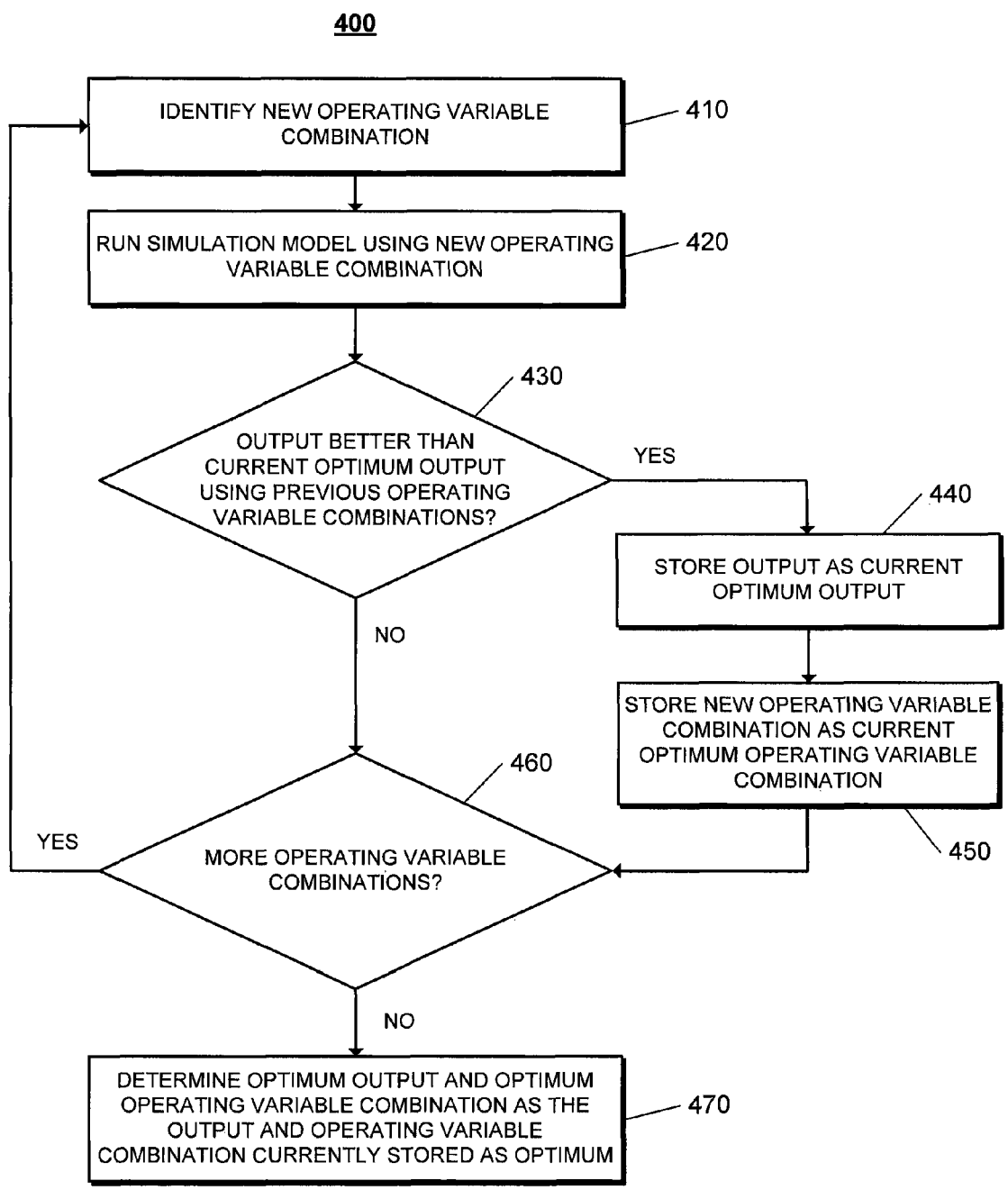

Referring to FIG. 4, an example process 400 of optimizing a simulation model is illustrated. The process 400 may be performed by the processor 240 included in the predictive modeling system 205 discussed above with respect to FIG. 2.

The processor 240 identifies a new operating variable combination (410). The new operating variable combination is a possible operating variable combination that has not been previously simulated. The possible operating variable combinations may be determined based on a range that each variable is able to fluctuate within the simulation (e.g., a price variable may be able to fluctuate between $1.50 and $2.75). The range may be set by a customer (e.g., a business selling a product) or may be set based on constraints of implementing the policy (e.g., a price variable cannot have a value equal to or lower than zero).

In identifying new operating variable combinations, a particular operating variable may be varied using a predetermined increment (e.g., $0.05 for a price variable), rather than testing all possible values in the range. The predetermined increment may be set by a customer (e.g., a business selling a product) or may be set based on constraints of implementing the policy (e.g., a price variable cannot be incremented by a fraction of a cent).

The processor 240 also may select a new operating variable combination based on results of prior simulations. For instance, the processor 240 may be varying a particular variable while holding all other operating variables constant. If the processor 240 identifies a trend that raising the value of the variable corresponds to a decrease in performance (e.g., an increase in cost), the processor 240 may forego varying the particular variable throughout the entire range because past simulation results indicate that further increases will not result in optimum performance.

The processor 240 runs the simulation model using the new operating variable combination (420). For instance, the processor 240 simulates the corresponding policy for managing the set data using the new operating variable combination to generate an output. The output of the simulation may include performance data, such as an anticipated cost/contribution metric (e.g., profit) of implementing the policy. The output may be a probability distribution that includes a variety of simulated results and the probability associated with each of the results.

The processor 240 determines whether the output is better than the current optimum output computed using the simulation model with at least one previous operating variable combination (430). In some implementations, the processor 240 accesses, from electronic storage, stored data that includes the current optimum output, and the processor 240 compares the output generated using the new operating variable combination to the accessed current optimum output.

If the output is better than the current optimum output, the processor 240 stores the output as the current optimum output (440) and stores the new operating variable combination as the current optimum operating variable combination (450). For instance, the processor 240 replaces, in electronic storage, the previous data (e.g., value/values) for the current optimum output with the output generated by running the simulation model using the new operating variable combination and replaces, in electronic storage, the previous data (e.g., value/values) for the current optimum operating variable combination with the new operating variable combination. If the output is not better than (e.g., the output is equal to or worse than) the current optimum output, the processor 240 maintains the previous data (e.g., value/values) for the current optimum output and the current optimum operating variable combination.

After storing the output (440) and the operating variable combination (450) or determining that the output is not better than the current optimum output, the processor 240 determines whether more operating variable combinations exist that have not been tested (460). The processor 240 may reference a log of the operating variable combinations that have been attempted in optimizing the simulation model and determine whether all possible combinations have been attempted.

If more potential operating variable combinations exist, the processor 240 returns to the one or more operations associated with numeral 410 and simulates the additional operating variable combinations. If more potential operating variable combinations do not exist, the processor 240 determines the optimum output and the optimum operating variable combination as the output and operating variable combination currently stored as optimum (470). The optimum output and the optimum operating variable combination may be used when comparing the simulated policy against other policies.

Referring again to FIG. 3, the processor 240 computes, using the optimized simulation models, prediction data that estimates performance of the corresponding policy for managing the set of data (350). For instance, the processor 240 simulates the corresponding policy for managing the set data using the optimum operating variable combination. The prediction data may be the results of the simulation or one or more computed outputs using results of multiple simulations (e.g., a mean result, a median result, a standard deviation, or any other statistical metric that indicates estimated performance or quality of the result). The performance data may be an anticipated cost/contribution metric (e.g., profit) of implementing the policy, and may include a probability distribution that includes a variety of simulated results and the probability associated with each of the results. In some implementations, the processor 240 uses the optimum output computed during optimization of the simulation model as the prediction data. The processor 240 computes prediction data for each of the policies for managing the set of data under consideration.

The processor 240 compares the computed prediction data (360), and determines an optimum policy for managing the set of data based on the comparison (370). For example, the processor 240 compares the prediction data computed for each of the simulated policies and identifies the policy with the best estimated performance. In this example, the processor 240 may select the policy with the least estimated cost or the policy with the highest estimated profit.

The processor 240 also may compare multiple types of predicted results for each of the policies and select the policy that performs the best over the multiple types of predicted results. For example, the processor 240 may determine a ratio of a customer service metric and cost associated with providing the customer service metric and select the policy with the best ratio of customer service to cost. In this example, the ratio may be a ratio of delivery time of a product to a customer and shipping and handling cost. The processor 240 may select a first policy over a second policy that has a lower shipping and handling cost, but has a proportionately slower delivery time. A user may select the output (or combination of outputs) to use as criteria for identifying the policy that achieves the best performance.

The processor 240 generates an output based on the optimum policy for managing the set of data (380). For example, the processor 240 provides a display of the results of the comparison. The display may include a message indicating which of the policies for managing the set of data achieved the optimum estimated performance. The display also may include graphs, charts, tables, or other visual representations of the estimated performance of each of the multiple policies.

Figure 5:
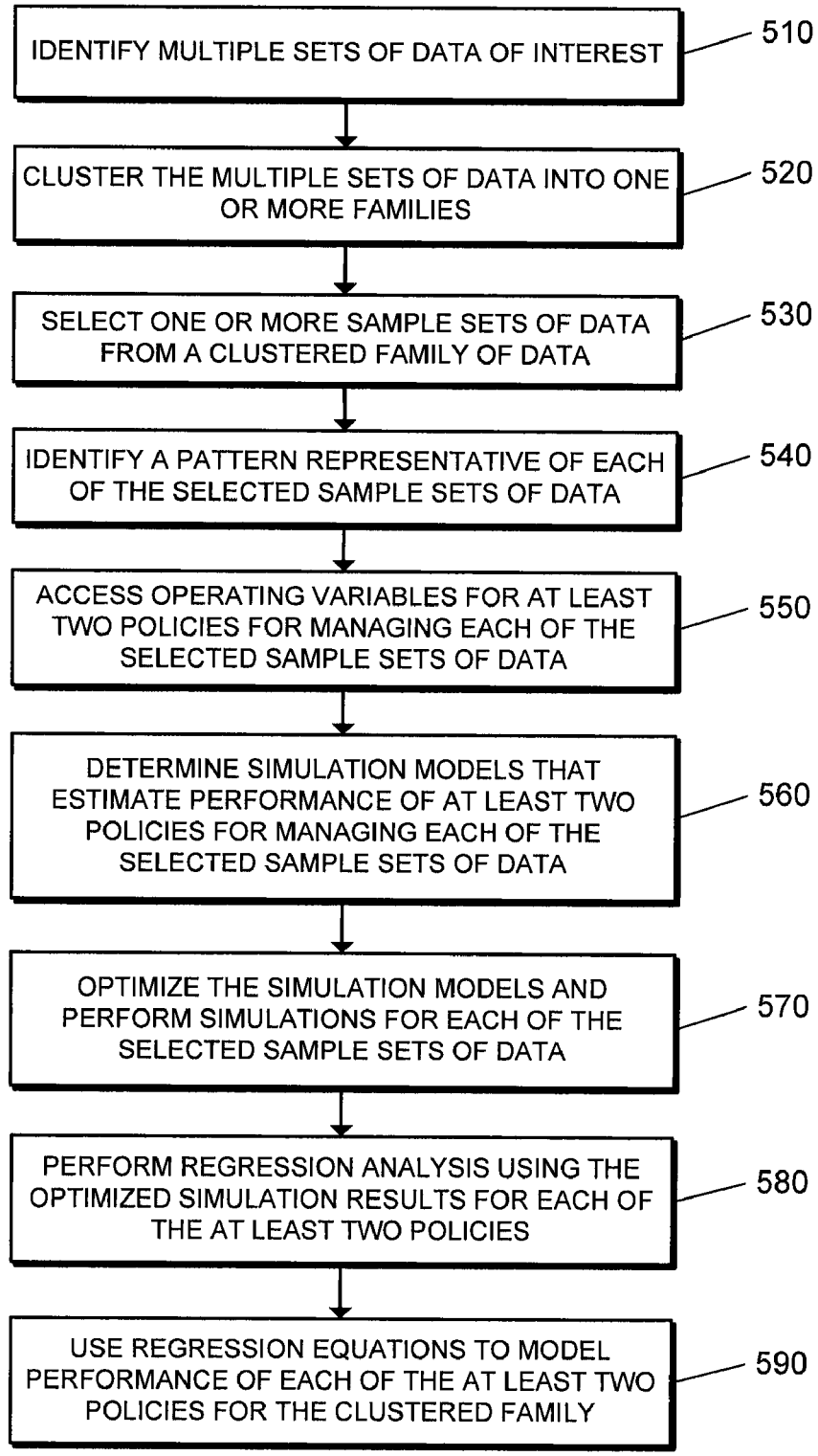

Referring to FIG. 5, an example process 500 is illustrated. The example process 500 models performance of each of at least two policies for managing a clustered family of data. The process 500 may be performed by the processor 240 included in the predictive modeling system 205 discussed above with respect to FIG. 2.

The processor 240 identifies multiple sets of data of interest (510). As discussed above, a set of data may include data that is related in some way (e.g., data that results from a particular process or data that relates to similar or the same items), may be any amount of data (e.g., a single entry or many entries), and may be in any format. The processor 240 identifies multiple sets of data that a user is interested in managing. For example, the processor 240 may receive user input identifying a database including multiple sets of data that a user is interested in managing. In this example, the processor 240 may receive further user input identifying specific sets of data included in the database or may automatically determine sets of data included in the database by identifying related data entries. Each set of data may be generated by a different process or may be related to a different item.

The processor 240 clusters the multiple sets of data into one or more families (520). The processor 240 may cluster sets of data into families with common patterns and/or attributes. The families may include sets of data that can inherit common management policies because characteristics of the sets of data (or processes giving rise to the sets of data) are similar. The processor may compare attributes related to the sets of data and cluster the sets of data having similar attributes together based on the comparison.

The processor 240 selects one or more sample sets of data from a clustered family of data (530). The sample sets of data may be one or more particular sets of data included in the clustered family. The samples may be selected randomly or using techniques that identify samples of data that are representative of the entire family of data. As discussed in more detail below, the processor 240 applies the simulation results for the sample sets of data to the entire family without having to individually analyze each set of data within the family.

The processor 240 identifies a pattern representative of each of the selected sample sets of data (540). The processor may identify a pattern by analyzing each of the sample sets of data as stochastic processes and determining a stochastic model or probability distribution for each of the sample sets of data that simulates the corresponding sample set of data. For instance, the processor 240 may identify a pattern representative of each of the selected sample sets of data using techniques similar to those described above with respect to reference numeral 310 shown in FIG. 3.

The processor 240 accesses operating variables for at least two policies for managing each of the selected sample sets of data (550). The processor 240 may access operating variables using techniques similar to those described above with respect to reference numeral 320 shown in FIG. 3.

The processor 240 determines simulation models that estimate performance of at least two policies for managing each of the selected sample sets of data (560). The processor 240 may create a simulation model (or access a previously created simulation model) that is able to predict the cost and contribution for each of the at least two policies and tailor each of the simulation models to each of the selected sample sets of data. In this regard, the processor 240 may modify the simulation models to operations or attributes specific to each of the sample sets of data. The processor 240 may determine a simulation model using techniques similar to those described above with respect to reference numeral 330 shown in FIG. 3.

The processor 240 optimizes the simulation models and performs simulations for each of the selected sample sets of data (570). For instance, the processor 240 may optimize each of the simulation models and generate simulation results for each of the selected sample sets of data using techniques similar to those discussed above with respect to reference numerals 340 and 350 shown in FIG. 3. After performing simulations using the optimized simulation models, the processor 240 may identify a list of parameters along with optimum policy variables for each of the selected sample sets of data. The list may include, for each of the selected samples, optimum performance data and optimum operating variables for each of the at least two policies under consideration.

The processor 240 performs regression analysis using the optimized simulation results for each of the at least two policies (580). The regression analysis results in one or more equations that may be used as a best fit for modeling performance of the entire clustered family of data. In performing the regression analysis, the operating variables may be the independent variables and performance data may be the dependent variable. In some implementations, the processor 240 accesses the list that includes, for each of the selected samples, optimum performance data and optimum operating variables for each of the at least two policies under consideration, and performs a regression analysis on the data in the list for each of the different policies. In these implementations, the processor 240 determines, for each of the policies, one or more regression equations (or regression coefficients) that represents a best fit of the collective data defining the optimum operating variables and optimum performance for all of the selected sample sets of data. Accordingly, for a particular policy, the processor 240 determines a regression equation (or multiple equations/coefficients) that models performance of the particular policy for the entire family of data.

The processor 240 uses the regression equations to model performance of each of the at least two policies for the clustered family of data (590). For instance, for a particular policy, the processor 240 uses the determined regression equation for the particular policy to model performance of the particular policy (e.g., compute performance data) generally for the entire family of data. The results of the regression equation for the particular policy may then be compared to results of regression equations determined for other policies. Based on the comparison, the processor 240 identifies the best policy for managing the entire family of data and the optimum operating variables for the identified policy. The processor 240, thus, models performance of the clustered family without performing simulations for each set of data included in the clustered family. As such, the processor 240 is able to determine which of the at least two policies is better for managing the clustered family of data without analyzing sets of data included in the clustered family of data other than the selected sample sets of data (e.g., a subset of the clustered family of data).

Figure 6:
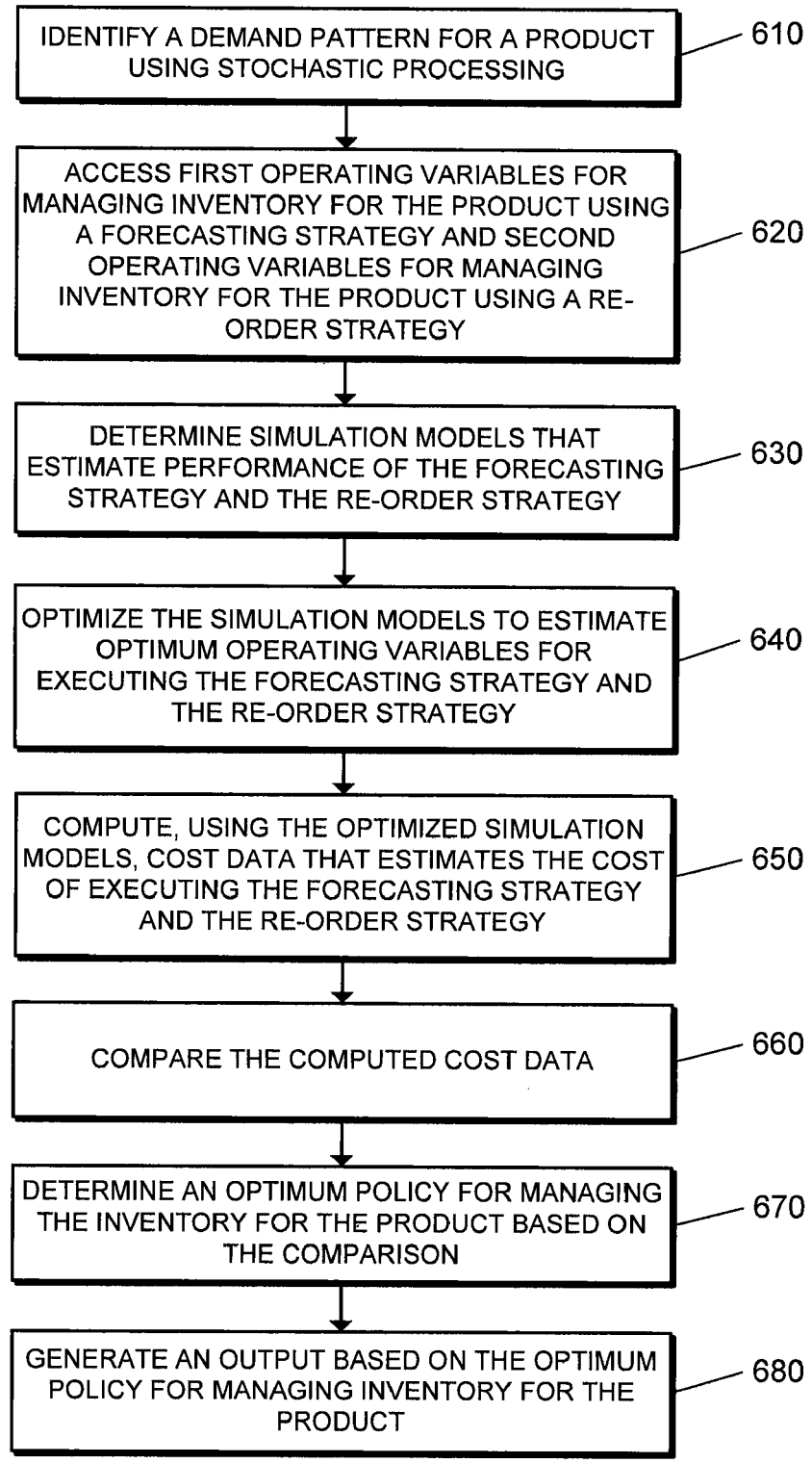

Referring to FIG. 6, an example process 600 is illustrated. The process 600 is an example of the process 300 that generates an output based on a policy determined to be an optimum policy for managing a set of data. The process 600 may be performed by the processor 240 included in the predictive modeling system 205 discussed above with respect to FIG. 2. In general, the process 600 provides a mathematical solution to identify the best inventory policy (e.g., between forecast and re-order) for a particular product along with the optimum variables for the identified inventory policy.

More specifically, the processor 240 identifies a demand pattern for a product using stochastic processing (610). For example, the processor 240 identifies the best-fit stochastic probability distribution that replicates the consumption of the inventory for the product. In this example, the processor 240 accesses, from electronic storage, historical sales data for the product and identifies a demand pattern for the product using stochastic processing. The demand pattern may be used to simulate demand for the product in assessing which inventory management strategy is preferred.

In some implementations, the processor 240 may access (or group) historical sales data for the product into weekly time buckets over several years. The historical sales data is treated as a set of random numbers one week after another and the processor 240 attempts to fit the historical sales data into a random number equation that replicates the historical demand in terms of cost. The processor 240 may use stochastic simulation to fit the historical sales data into the best random number equation.

The processor 240 accesses first operating variables for managing inventory for the product using a forecasting strategy and second operating variables for managing inventory for the product using a re-order strategy (620). For instance, a user may identify, quantify, and key in operating and financial variables relevant to implementing each of a forecasting inventory management strategy and a re-order inventory management strategy. The processor 240 may access the operating and financial variables by receiving user input resulting from the user keying in the operating and financial variables or may access the operating and financial variables by retrieving the operating and financial variables from electronic storage.

The operating variables may include operation metrics and financial/business metrics. The operation metrics may include a demand pattern for the product, initial inventory and inventory position for the product, lead time for the product, order cost for the product, inventory holding cost for the product, inventory handling cost for the product, mean forecast error for the product, and other operation costs and attributes. The financial/business metrics may include weighted average cost of capital (WACC), price of the product, contribution margin per unit of the product, cost of lost sale of the product, and other financial/business costs associated with transactions (e.g., sales) involving the product. The operating variables enable the processor 240 to compute costs and profits (e.g., losses and gains) associated with certain events related to the product (e.g., storing a particular number of products for a period of time, losing a sale, making a sale, adding inventory, etc.) and predict whether particular sales practices may occur (e.g., can inventory be replenished before losing a potential sale, etc.).

Some operating variables may be defined as constants when no change in the operating variable is possible (e.g., the customer is unwilling to change or it is impossible to change) and other operating variables may be defined as a range of potential values (e.g., the customer is willing and it is possible to change the operating variable within a range of values). When the operating variables are defined as a range, an optimum value within the range may be determined when optimizing the simulation model.

In addition, the operating variables may be defined as functions of other operating variables. For example, a company may have various lead times possible for a product. In this example, each of the lead times may have a corresponding shipping and handling cost, which increases as the lead time decreases. Accordingly, optimizing the lead time and shipping and handling cost operating variables may involve identifying the lead time/shipping and handling cost pair that results in the least cost as compared to level of service provided.

The operating variables for the forecasting inventory management strategy may be different than the operating variables for the re-order inventory management strategy (e.g., the re-order strategy does not have the increased cost of forecasting inventory replenishment, such as determining how much inventory to order and how frequently to order). The operating variables for the forecasting inventory management strategy may have different values or a different range than the operating variables for the re-order inventory management strategy. For instance, the forecasting strategy may have a higher average inventory value for the product than the re-order strategy because the forecasting strategy replenishes inventory before reaching a minimum threshold.

The processor 240 determines simulation models that estimate performance of the forecasting strategy and the re-order strategy (630). Predetermined simulation models may exist for predicting the cost and contribution for each of the two inventory management strategies (re-order and forecasting). The processor 240 may access the predetermined simulation models and adapt the simulation models to a particular business and a particular product. Adapting the simulation models may include inputting the identified pattern for the product and the accessed operating variables to the predetermined simulation models. Adapting also may include adjusting certain relationships within the model to account for operations of the particular business for the particular product. Over time, the simulation models may be adjusted based on feedback and actual results observed in implementing the corresponding inventory management strategy for the particular business (or similar businesses) and the particular product (or similar products). A first simulation model may be determined for the forecasting inventory management strategy and a second simulation model may be determined for the re-order inventory management strategy.

The processor 240 optimizes the simulation models to estimate optimum operating variables for executing the forecasting strategy and the re-order strategy (640). In particular, the processor 240 determines first optimum operating variables (e.g., optimum values for the operating variables) for the forecasting simulation model and second optimum operating variables (e.g., optimum values for the operating variables) for the re-order simulation model. For each of the forecasting and re-order strategies, the processor 240 may perform multiple simulations with multiple possible operating variable combinations to identify the optimum inventory policy variables. The processor 240 may utilize techniques similar to those described above with respect to reference numeral 340 shown in FIG. 3.

The processor 240 computes, using the optimized simulation models, cost data that estimates the cost of executing the forecasting strategy and the re-order strategy (650). For instance, the processor 240 computes cost data for the forecasting strategy by performing a simulation using the forecasting simulation model with the optimum inventory policy variables for the forecasting strategy. The processor 240 also computes cost data for the re-order strategy by performing a simulation using the re-order simulation model with the optimum inventory policy variables for the re-order strategy. The computed cost data may reflect costs and/or profits associated with implementing the corresponding inventory management strategy. The computed cost data may be a single estimated value or a probability distribution of estimated values. The processor 240 also may perform statistical analysis on results of the simulation and use the statistical analysis as the computed cost data.

The processor 240 compares the computed cost data (660) and determines an optimum policy for managing the inventory for the product based on the comparison (670). For example, the processor 240 compares the cost data computed for the forecasting strategy with the cost data computed for the re-order strategy, and determines which inventory management strategy provides the least cost (or generates the highest profit).

The processor 240 generates an output based on the optimum policy for managing inventory for the product (680). The processor 240 provides a display of the results of the comparison of the forecasting strategy and the re-order strategy. The display may include a message indicating which of the strategies achieved better estimated performance (e.g., least cost or highest profits). The output may include graphs, charts, tables, or other visual representations of the computed cost data for each of the inventory management strategies.

Figure 7:
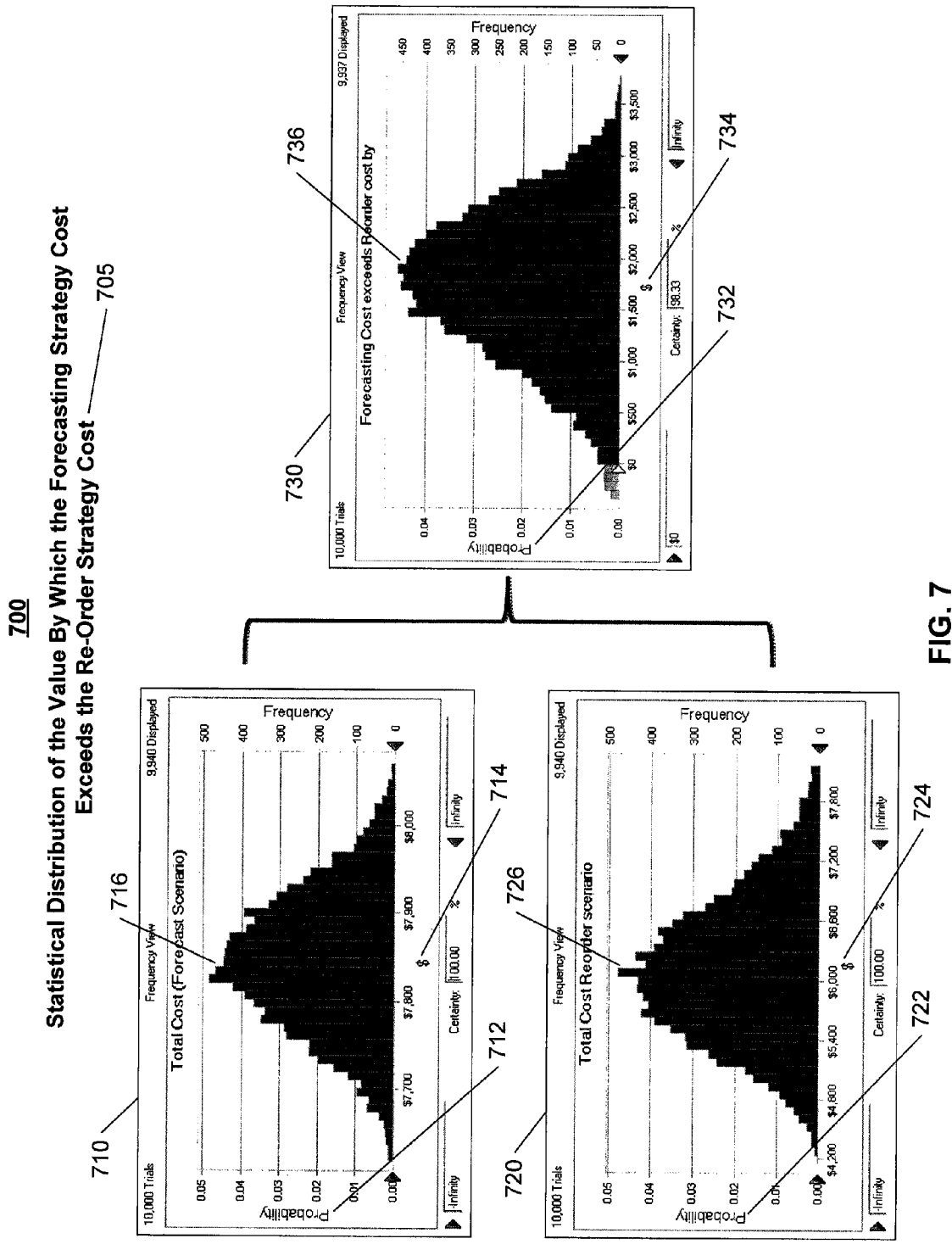
FIG. 7 is an exemplary output that illustrates a comparison of the performance of multiple policies for managing a set of data.

FIG. 7 illustrates an exemplary output 700 of a comparison of the performance of multiple policies for managing a set of data. The output 700 is an example of an output based on the optimum policy for managing inventory for the product that may be generated in accordance with processes described above with respect to numeral 680.

The output 700 includes a message 705 indicating which of the strategies achieved better estimated performance. Specifically, the message 705 indicates that the forecasting strategy cost exceeds the re-order strategy cost.

The output also includes a graph 710 showing a statistical distribution 716 of the total cost estimated for executing the forecasting inventory management strategy. The graph 710 has estimated cost 714 on the X-axis and corresponding probability 712 on the Y-axis. Accordingly, the graph 710 illustrates the estimated costs associated with implementing the forecasting inventory management strategy and the probabilities associated with the estimated costs.

The output further includes a graph 720 showing a statistical distribution 726 of the total cost estimated for executing the re-order inventory management strategy. The graph 720 has estimated cost 724 on the X-axis and corresponding probability 722 on the Y-axis. Accordingly, the graph 720 illustrates the estimated costs associated with implementing the re-order inventory management strategy and the probabilities associated with the estimated costs.

Finally, the output 700 includes a graph 730 showing a statistical distribution 736 of the difference between the total cost estimated for executing the forecasting inventory management strategy and the total cost estimated for executing the re-order inventory management strategy. The graph 730 has estimated cost difference 734 on the X-axis and corresponding probability 732 on the Y-axis. Accordingly, the graph 730 illustrates the estimated cost difference between implementing the forecasting inventory management strategy and the re-order inventory management strategy and the probabilities associated with the estimated cost difference.

Figure 8:
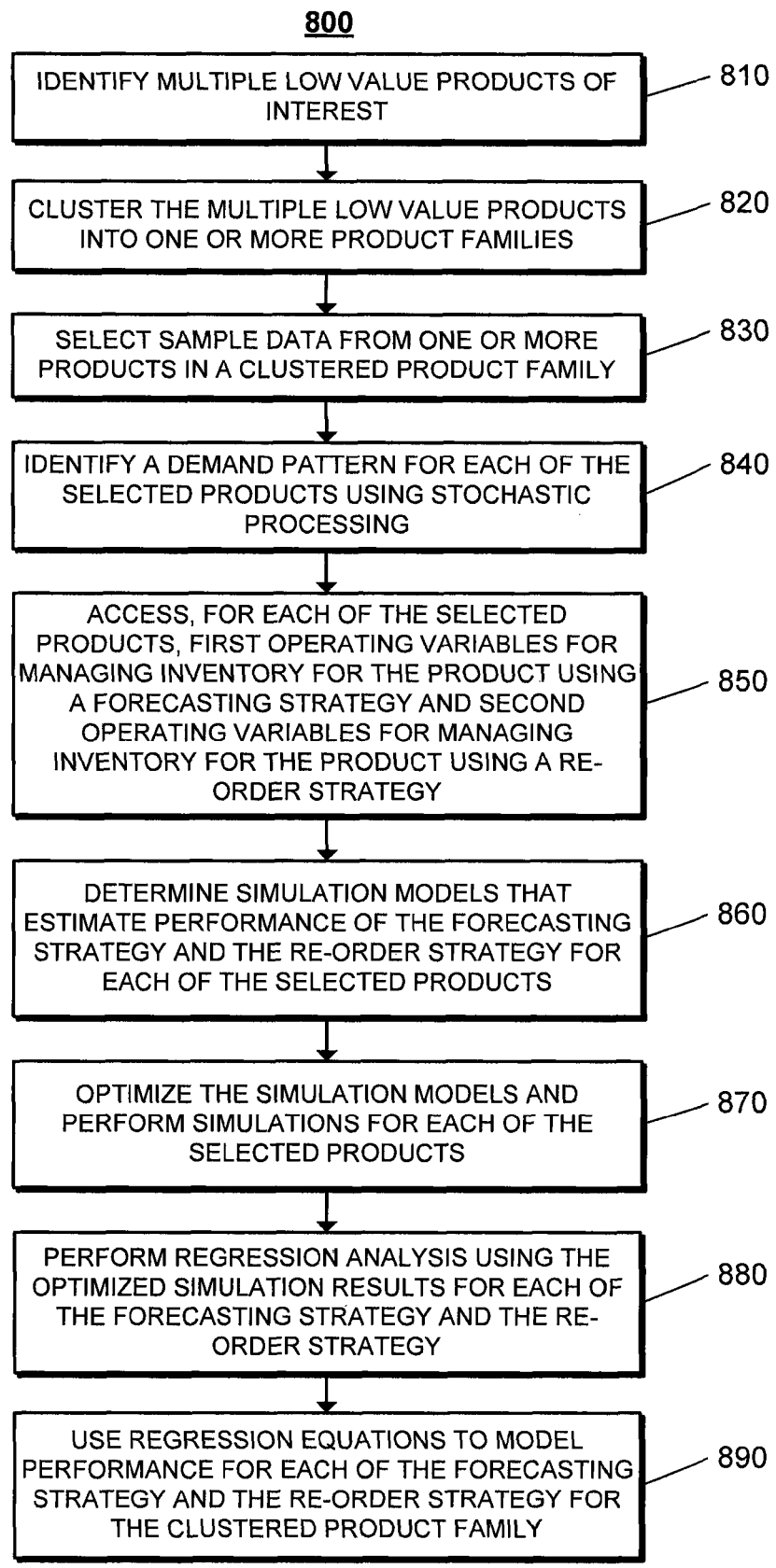

Referring to FIG. 8, an example process 800 is illustrated. The process 800 is an example of the process 500 that models performance of each of the at least two policies for a clustered family of data. The process 800 may be performed by the processor 240 included in the predictive modeling system 205 discussed above with respect to FIG. 2.

The processor 240 identifies multiple low value products of interest (810). For instance, the processor 240 receives user input identifying products that a user is interested in managing. The identified products may all be low value products or the processor 240 may analyze the identified products and identify those that have low values and would benefit from clustering.

The processor 240 clusters the multiple low value products into one or more product families (820). If low value products are involved, the processor 240 clusters the low value products into families that have close values of operating and financial variables. The clustered products may have similar demand and inventory characteristics and, therefore, the processor 240 may determine that a common inventory management strategy is likely to optimize performance for all of the low value products included in the clustered product family. The processor 240 may compare attributes of each of the low value products and group the low value products into families having similar attributes.

The processor 240 selects sample data from one or more products in a clustered product family (830). The sample data for the one or more products may be selected randomly or using techniques that identify products that are representative of the entire product family. The sample data may include some or all of the product data associated with each of a subset of products selected from the product family. As discussed in more detail below, the processor 240 applies the simulation results for the sample products to the entire product family without having to individually analyze each product within the family. Analyzing less than all of the products in the family may offer a cost and processing saving that enables inventory management policy analysis to be applied to low value products.

The processor 240 identifies a demand pattern for each of the selected products using stochastic processing (840). For example, the processor 240 identifies the best-fit stochastic probability distribution that replicates the consumption of the inventory for each of the selected products. In this example, the processor 240 accesses, from electronic storage, historical sales data for each of the selected products and identifies a demand pattern for each of the selected products using stochastic processing. The demand patterns may be used to simulate demand for the products in assessing which inventory management strategy is preferred.

The processor 240 accesses, for each of the selected products, first operating variables for managing inventory for the product using a forecasting strategy and second operating variables for managing inventory for the product using a re-order strategy (850). For each of the selected products, the processor 240 may access first operating variables for managing inventory for the corresponding product using a forecasting strategy and second operating variables for managing inventory for the corresponding product using a re-order strategy using techniques described above with respect to reference numeral 620 shown in FIG. 6.

The processor 240 determines simulation models that estimate performance of the forecasting strategy and the re-order strategy for each of the selected products (860). For instance, for each of the selected products, the processor 240 determines a first simulation model that estimates performance of the forecasting strategy and a second simulation model that estimates performance of the re-order strategy for each of the selected products. The processor 240 may determine simulation models that estimate performance of the forecasting strategy and the re-order strategy using techniques similar to those described above with respect to reference numeral 630 shown in FIG. 6.

The processor 240 optimizes the simulation models and performs simulations for each of the selected products (870). The processor 240 optimizes and runs, for each of the selected products, the first simulation model for the forecasting strategy and the second simulation model for the re-order strategy. The results of the simulations includes, for each of the selected products, an optimized simulation model for each of the forecasting and re-order strategies and cost and contribution estimates of executing each of the optimized simulation models. A table or list may be used store the selected product, the optimum forecasting operating variables for the selected product, the optimum forecasting cost for the selected product, the optimum re-order operating variables for the selected product, and the optimum re-order cost for the selected product. The processor 240 may optimize the simulation models and perform simulations using techniques similar to those described above with respect to reference numerals 640 and 650 shown in FIG. 6.

The processor 240 performs regression analysis using the optimized simulation results for each of the forecasting strategy and the re-order strategy (880). For instance, the processor 240 accesses the optimum operating variables and the optimum costs identified earlier and inputs the optimum operating variables and the optimum costs into a regression model to identify relationships between the independent variables (operating and financial variables) and the dependent variables related to cost and contribution expected from executing forecasting and re-order strategies. The result is a set of regression equations that can be used for each product in the family (although each product has not been analyzed) to predict cost and contribution expected from executing forecast and re-order driven inventory management. The set of regression equations includes one or more equations used to compute cost and contribution expected from executing a forecasting inventory management strategy and one or more equations used to compute cost and contribution expected from executing a re-order inventory management strategy.

The processor 240 uses regression equations to model performance for each of the forecasting strategy and the re-order strategy for the clustered product family (890). In particular, the processor 240 computes, using the regression equations, first prediction data related to cost and contribution expected from executing the forecasting inventory management strategy and second prediction data related to cost and contribution expected from executing the re-order inventory management strategy. Both the first prediction data and the second prediction data applies to the entire clustered product family and may be compared to determine whether a forecasting inventory management strategy is better than a re-order inventory management strategy for the clustered product family.

Figure 9:
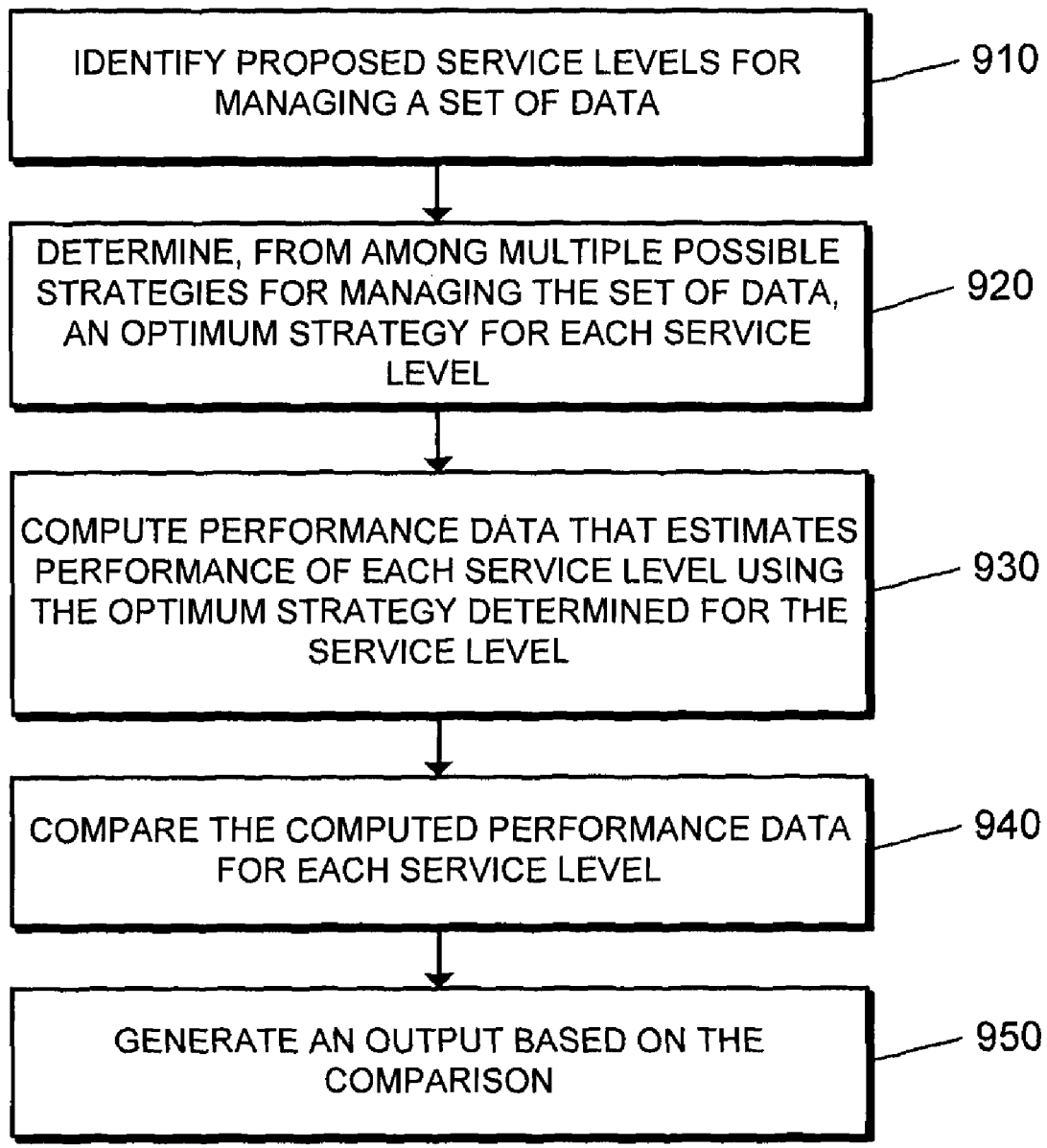

Referring to FIG. 9, an example process 900 is illustrated. The process 900 generates an output based on a comparison of multiple possible service levels for managing a set of data. The process 900 may be performed by the processor 240 included in the predictive modeling system 205 discussed above with respect to FIG. 2.

The processor 240 identifies proposed service levels for managing a set of data (910). The proposed service levels may be different service levels a particular business is considering offering for a particular product. A service level relates to the type of customer service the business provides with respect to a good or service. For example, a service level may be the time it takes a business to fulfill an order from when the business receives the order. In this example, a first service level may be that ninety five percent of orders ship within twenty four hours of receipt and a second service level may be that ninety percent of orders ship within twenty four hours of receipt. The service levels may have different costs associated with them and the customer assesses the differences in cost when deciding the service level to provide.

The processor 240 determines, from among multiple possible strategies for managing the set of data, an optimum strategy for each service level (920). For example, for each service level, the processor 240 determines whether a forecasting inventory management strategy or a re-order inventory management strategy has a lower cost for meeting the corresponding service level. In this example, the processor 240 also determines optimum operating variables for each of the forecasting inventory management strategy and the re-order inventory management strategy in determining which of the strategies has the lower cost. The processor 240 may determine an optimum strategy for a particular service level using any of the processes 300, 500, 600, and 800 described above.

The processor 240 computes performance data that estimates performance of each service level using the optimum strategy determined for the service level (930). For instance, the processor 240 simulates performance of the service level using the optimum strategy with the optimum operating variable combination. The prediction data may be the results of the simulation or one or more computed outputs using results of multiple simulations (e.g., a mean result, a median result, a standard deviation, or any other statistical metric that indicates estimated performance or quality of the result). The performance data may be an anticipated cost/contribution metric (e.g., profit) of implementing the strategy, and may include a probability distribution that includes a variety of simulated results and the probability associated with each of the results. By computing performance data that estimates performance of each service level using the optimum strategy, the processor 240 places a cost level on each of the proposed service levels that may be used for comparing the proposed service levels.

The processor 240 compares the computed performance data for each service level (940). For instance, the processor 240 may identify the service level that offers the least cost or the best performance (e.g., the best profit). The processor 240 may account for increased demand or customer satisfaction in comparing the cost/contribution of different service levels. In some implementations, the processor 240 may arrange the computed performance data in a format that enables a user to assess the different costs associated with the different service levels without identifying a service level as being preferred. In these implementations, the processor 240 may generate a table that lists the different service levels and the costs associated therewith. The processor 240 also may determine that moving from a first service level to a second service level increases cost by a particular amount.

The processor 240 generates an output based on the comparison (950). For instance, the processor 240 may display a message indicating which of the proposed service levels offers the best performance or may provide a ranking of the performance of the proposed service levels. The processor 240 also may display the computed performance data for each of the proposed service levels in a format that enables a user to compare the different service levels. For instance, the processor 240 may display a table that lists the different service levels and the costs associated therewith or provide an indication that moving from a first service level to a second service level increases cost by a particular amount.

The processor 240 further may store, in electronic storage, results of the comparison and the computed performance data for each service level. In addition, in implementations in which the processor 240 identifies the optimum or preferred service level, the processor 240 may update configurations of the system 205 based on the predicted optimum service level automatically without user intervention. In these implementations, the processor 240 may automatically configure an inventory management system to place orders and/or generate reminders or reports using the optimum inventory management strategy and optimum operating variables for the identified service level.

Figure 10:
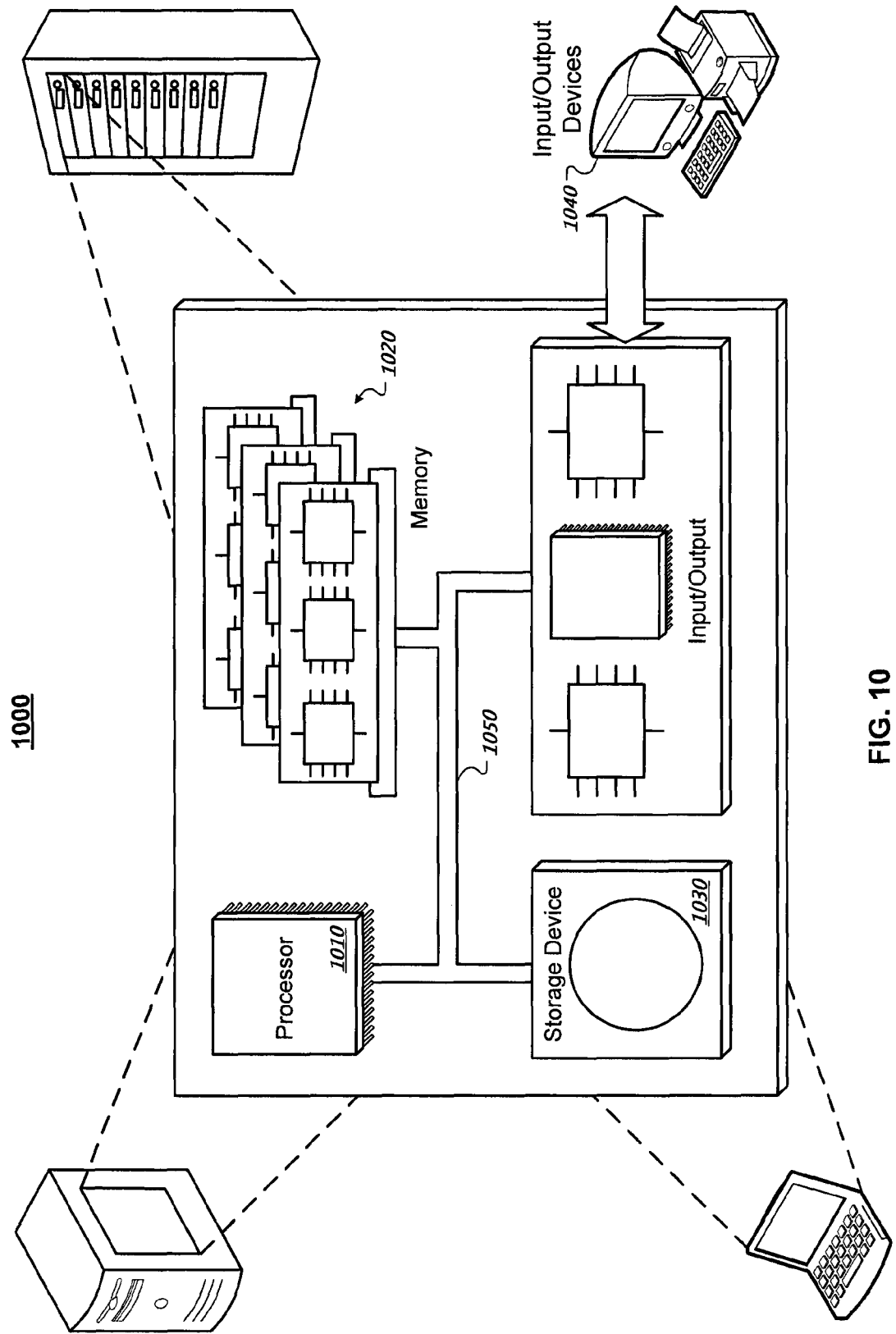
FIG. 10 is a schematic diagram of an exemplary system.

FIG. 10 is a schematic diagram of a generic computer system 1000. The system 1000 can be used for the operations described in association with any of the computer-implemented methods described previously. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable storage medium. In one implementation, the memory 1020 is a volatile memory unit. In another implementation, the memory 1020 is a non-volatile memory unit.

The storage device 1030 is capable of providing mass storage for the system 1000. In some implementation, the storage device 1030 is a computer-readable storage medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method of predictive modeling comprising:
   accessing, from electronic storage, historical sales data for a product;
   identifying a demand pattern for the product using stochastic processing;
   accessing first operating variables for managing inventory for the product using a forecasting strategy;
   determining a first simulation model that estimates performance of the forecasting strategy;
   optimizing the first simulation model to estimate optimum operating variables for executing the forecasting strategy;
   computing, using the optimized first simulation model and by at least one processor, first cost data that estimates the cost of executing the forecasting strategy;
   accessing second operating variables for managing inventory for the product using a re-order strategy;
   determining a second simulation model that estimates performance of the re-order strategy;
   optimizing the second simulation model to estimate optimum operating variables for executing the re-order strategy;
   computing, using the optimized second simulation model and by at least one processor, second cost data that estimates the cost of executing the re-order strategy;
   comparing the first cost data that estimates the cost of executing the forecasting strategy with the second cost data that estimates the cost of executing the re-order strategy;
   based on the comparison of the first cost data with the second cost data, determining whether the estimated cost of executing the forecasting strategy is less than the estimated cost of executing the re-order strategy; and
   storing, in electronic storage, results of the determination of whether the estimated cost of executing the forecasting strategy is less than the estimated cost of executing the re-order strategy.

2. The method of claim 1 further comprising:
   generating an output based on the determination of whether the estimated cost of executing the forecasting strategy is less than the estimated cost of executing the re-order strategy.

3. The method of claim 2 wherein generating an output based on the determination whether the estimated cost of executing the forecasting strategy is less than the estimated cost of executing the re-order strategy comprises:
   computing a difference between the estimated cost of executing the forecasting strategy and the estimated cost of executing the re-order strategy;
   generating a graph showing the difference between the estimated cost of executing the forecasting strategy and the estimated cost of executing the re-order strategy; and
   displaying the graph showing the difference between the estimated cost of executing the forecasting strategy and the estimated cost of executing the re-order strategy with an indication of whether the estimated cost of executing the forecasting strategy is less than the estimated cost of executing the re-order strategy.

4. The method of claim 1 wherein accessing first and second operating variables comprises accessing at least one of initial inventory of the product, lead time for the product, inventory holding cost for the product, inventory handling cost for the product, mean forecast error, weighted average cost of capital, contribution margin of the product, and cost of lost sale of the product.

5. A computer-implemented method of predictive modeling comprising:
   accessing, from electronic storage, a set of data;
   identifying a pattern representative of the set of data;
   accessing first operating variables that correspond to a first policy for managing the set of data;
   determining a first simulation model that estimates performance of the first policy for managing the set of data based on the identified pattern representative of the set of data and the accessed first operating variables;
   optimizing the first simulation model to estimate optimum operating variables for executing the first policy for managing the set of data;
   computing, using the optimized first simulation model, first prediction data that estimates performance of the first policy for managing the set of data;
   accessing second operating variables that correspond to a second policy for managing the set of data;
   determining a second simulation model that estimates performance of the second policy for managing the set of data based on the identified pattern representative of the set of data and the accessed second operating variables;

optimizing the second simulation model to estimate optimum operating variables for executing the second policy for managing the set of data;

computing, using the optimized second simulation model, second prediction data that estimates performance of the second policy for managing the set of data;

comparing the first prediction data with the second prediction data;

based on the comparison of the first prediction data with the second prediction data, determining whether the estimated performance of the first policy for managing the set of data is better than the estimated performance of the second policy for managing the set of data;

storing, in electronic storage, results of the determination of whether the estimated performance of the first policy for managing the set of data is better than the estimated performance of the second policy for managing the set of data;

identifying multiple constraints for managing the set of data;

determining, from among at least the first and second policies for managing the set of data, an optimum policy for managing the set of data for each of the multiple constraints;

computing performance data that estimates performance of each of the multiple constraints using the optimum policy determined for the each of the multiple constraints;

comparing the computed performance data for each of the multiple constraints; and generating an output based on the comparison, wherein identifying multiple constraints for managing the set of data comprises identifying multiple service levels for providing a product;

wherein determining, from among at least the first and second policies for managing the set of data, the optimum policy for managing the set of data for each of the multiple constraints comprises determining, from among at least a forecasting strategy and a re-order strategy for managing inventory for the product, an optimum strategy for managing inventory for the product for each of the multiple service levels;

wherein computing performance data that estimates performance of each of the multiple constraints using the optimum policy determined for the each of the multiple constraints comprises computing, by at least one processor, cost data that estimates a cost of achieving each of the multiple service levels using the optimum policy determined for the each of the multiple service levels;

wherein comparing the computed performance data for each of the multiple constraints comprises comparing the computed cost data that estimates the cost of achieving each of the multiple service levels; and wherein generating an output based on the comparison comprises displaying, on a display device, an indication of the cost and contribution of achieving each of the multiple service levels.

6. A computer-implemented method of predictive modeling comprising:

identifying multiple products of interest;

clustering the multiple products into one or more product families that include products having similar operating variables;

selecting sample data from one or more products in a clustered product family;

identifying a demand pattern for each of the selected products using stochastic processing;

accessing, for each of the selected products, first operating variables for managing inventory for the product using a forecasting strategy and second operating variables for managing inventory for the product using a re-order strategy;

determining simulation models that estimate performance of the forecasting strategy and the re-order strategy for each of the selected products;

optimizing each of the simulation models to estimate optimum operating variables for executing each of the forecasting strategy and the re-order strategy;

performing, using each of the optimized simulation models, simulations for each of the selected products;

performing, for each of the forecasting strategy and the re-order strategy, regression analysis using the optimized simulation results for each of the selected products;

computing, by at least one processor and using regression equations based on the regression analysis, performance data that estimates performance of each of the forecasting strategy and the re-order strategy for managing inventory of the clustered product family;

determining which of the forecasting strategy and the re-order strategy is better for managing inventory of the clustered product family based on the computed performance data; and storing, in electronic storage, results of the determination of which of the forecasting strategy and the re-order strategy is better for managing inventory of the clustered product family.

7. The method of claim 6 wherein determining which of the forecasting strategy and the re-order strategy is better for managing inventory of the clustered product family based on the computed performance data comprises determining which of the forecasting strategy and the re-order strategy is better for managing inventory of the clustered product family without analyzing all of the products in the clustered product family.

8. The method of claim 6 wherein determining which of the forecasting strategy and the re-order strategy is better for managing inventory of the clustered product family based on the computed performance data comprises determining which of the forecasting strategy and the re-order strategy is better for managing inventory of the clustered product family without analyzing all of data in the clustered product family.

9. A predictive modeling system comprising:

at least one electronic data store; and at least one processor configured to perform operations comprising:

identifying multiple products of interest;

clustering the multiple products into one or more product families that include products having similar operating variables;

selecting sample data from one or more products in a clustered product family;

identifying a demand pattern for each of the selected products using stochastic processing;

accessing, for each of the selected products, first operating variables for managing inventory for the product using a forecasting strategy and second operating variables for managing inventory for the product using a re-order strategy;

determining simulation models that estimate performance of the forecasting strategy and the re-order strategy for each of the selected products;

optimizing each of the simulation models to estimate optimum operating variables for executing each of the forecasting strategy and the re-order strategy;

performing, using each of the optimized simulation models, simulations for each of the selected products;

performing, for each of the forecasting strategy and the re-order strategy, regression analysis using the optimized simulation results for each of the selected products;

computing, using regression equations based on the regression analysis, performance data that estimates performance of each of the forecasting strategy and the re-order strategy for managing inventory of the clustered product family;

determining which of the forecasting strategy and the re-order strategy is better for managing inventory of the clustered product family based on the computed performance data; and storing, in electronic storage, results of the determination of which of the forecasting strategy and the re-order strategy is better for managing inventory of the clustered product family.

10. The predictive modeling system of claim 9 wherein determining which of the forecasting strategy and the re-order strategy is better for managing inventory of the clustered product family based on the computed performance data comprises determining which of the forecasting strategy and the re-order strategy is better for managing inventory of the clustered product family without analyzing all of the products in the clustered product family.

11. The predictive modeling system of claim 9 wherein determining which of the forecasting strategy and the re-order strategy is better for managing inventory of the clustered product family based on the computed performance data comprises determining which of the forecasting strategy and the re-order strategy is better for managing inventory of the clustered product family without analyzing all of data in the clustered product family.

12. A predictive modeling system comprising:
at least one electronic data store; and
at least one processor configured to perform operations comprising:
accessing, from electronic storage, a set of data;
identifying a pattern representative of the set of data;
accessing first operating variables that correspond to a first policy for managing the set of data;
determining a first simulation model that estimates performance of the first policy for managing the set of data based on the identified pattern representative of the set of data and the accessed first operating variables;
optimizing the first simulation model to estimate optimum operating variables for executing the first policy for managing the set of data;
computing, using the optimized first simulation model, first prediction data that estimates performance of the first policy for managing the set of data;
accessing second operating variables that correspond to a second policy for managing the set of data;
determining a second simulation model that estimates performance of the second policy for managing the set of data based on the identified pattern representative of the set of data and the accessed second operating variables;
optimizing the second simulation model to estimate optimum operating variables for executing the second policy for managing the set of data;
computing, using the optimized second simulation model, second prediction data that estimates performance of the second policy for managing the set of data;
comparing the first prediction data with the second prediction data;
based on the comparison of the first prediction data with the second prediction data, determining whether the estimated performance of the first policy for managing the set of data is better than the estimated performance of the second policy for managing the set of data;
storing, in electronic storage, results of the determination of whether the estimated performance of the first policy for managing the set of data is better than the estimated performance of the second policy for managing the set of data;
identifying multiple constraints for managing the set of data;
determining, from among at least the first and second policies for managing the set of data, an optimum policy for managing the set of data for each of the multiple constraints;
computing performance data that estimates performance of each of the multiple constraints using the optimum policy determined for the each of the multiple constraints;
comparing the computed performance data for each of the multiple constraints; and
generating an output based on the comparison,
wherein identifying multiple constraints for managing the set of data comprises identifying multiple service levels for providing a product;
wherein determining, from among at least the first and second policies for managing the set of data, the optimum policy for managing the set of data for each of the multiple constraints comprises determining, from among at least a forecasting strategy and a re-order strategy for managing inventory for the product, an optimum strategy for managing inventory for the product for each of the multiple service levels;
wherein computing performance data that estimates performance of each of the multiple constraints using the optimum policy determined for the each of the multiple constraints comprises computing cost data that estimates a cost of achieving each of the multiple service levels using the optimum policy determined for the each of the multiple service levels;
wherein comparing the computed performance data for each of the multiple constraints comprises comparing the computed cost data that estimates the cost of achieving each of the multiple service levels; and
wherein generating an output based on the comparison comprises displaying, on a display device, an indication of the cost and contribution of achieving each of the multiple service levels.

13. A predictive modeling system comprising:
at least one electronic data store; and
at least one processor configured to perform operations comprising:
accessing, from electronic storage, historical sales data for a product;
identifying a demand pattern for the product using stochastic processing;
accessing first operating variables for managing inventory for the product using a forecasting strategy;

determining a first simulation model that estimates performance of the forecasting strategy;

optimizing the first simulation model to estimate optimum operating variables for executing the forecasting strategy;

computing, using the optimized first simulation model, first cost data that estimates the cost of executing the forecasting strategy;

accessing second operating variables for managing inventory for the product using a re-order strategy;

determining a second simulation model that estimates performance of the re-order strategy;

optimizing the second simulation model to estimate optimum operating variables for executing the re-order strategy;

computing, using the optimized second simulation model, second cost data that estimates the cost of executing the re-order strategy;

comparing the first cost data that estimates the cost of executing the forecasting strategy with the second cost data that estimates the cost of executing the re-order strategy;

based on the comparison of the first cost data with the second cost data, determining whether the estimated cost of executing the forecasting strategy is less than the estimated cost of executing the re-order strategy; and storing, in electronic storage, results of the determination of whether the estimated cost of executing the forecasting strategy is less than the estimated cost of executing the re-order strategy.

14. The predictive modeling system of claim 13 wherein the operations further comprise:

generating an output based on the determination of whether the estimated cost of executing the forecasting strategy is less than the estimated cost of executing the re-order strategy.

15. The predictive modeling system of claim 14 wherein generating an output based on the determination whether the estimated cost of executing the forecasting strategy is less than the estimated cost of executing the re-order strategy comprises:

computing a difference between the estimated cost of executing the forecasting strategy and the estimated cost of executing the re-order strategy;

generating a graph showing the difference between the estimated cost of executing the forecasting strategy and the estimated cost of executing the re-order strategy; and displaying the graph showing the difference between the estimated cost of executing the forecasting strategy and the estimated cost of executing the re-order strategy with an indication of whether the estimated cost of executing the forecasting strategy is less than the estimated cost of executing the re-order strategy.

16. The predictive modeling system of claim 13 wherein accessing first and second operating variables comprises accessing at least one of initial inventory of the product, lead time for the product, inventory holding cost for the product, inventory handling cost for the product, mean forecast error, weighted average cost of capital, contribution margin of the product, and cost of lost sale of the product.

* * * * *